(12) United States Patent
Shim et al.

(10) Patent No.: US 12,520,249 B2
(45) Date of Patent: Jan. 6, 2026

(54) POWER HEADROOM REPORT METHOD

(71) Applicant: LG ELECTRONICS INC., Seoul (KR)

(72) Inventors: Jaenam Shim, Seoul (KR); Hyunsoo Ko, Seoul (KR); Hyangsun You, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 408 days.

(21) Appl. No.: 18/019,422

(22) PCT Filed: Aug. 6, 2021

(86) PCT No.: PCT/KR2021/010432
§ 371 (c)(1),
(2) Date: Mar. 21, 2023

(87) PCT Pub. No.: WO2022/031119
PCT Pub. Date: Feb. 10, 2022

(65) Prior Publication Data
US 2023/0284155 A1     Sep. 7, 2023

(30) Foreign Application Priority Data

Aug. 6, 2020 (KR) .................. 10-2020-0098523

(51) Int. Cl.
*H04W 52/36* (2009.01)
*H04L 5/14* (2006.01)
(Continued)

(52) U.S. Cl.
CPC ............ *H04W 52/365* (2013.01); *H04L 5/14* (2013.01); *H04W 56/0015* (2013.01); *H04W 72/0457* (2023.01)

(58) Field of Classification Search
CPC ........... H04W 52/365; H04W 56/0015; H04W 72/0457; H04W 52/146; H04W 52/242;
(Continued)

(56) References Cited

U.S. PATENT DOCUMENTS

| 10,624,045 B2 * | 4/2020 | Park ................... H04W 52/365 |
| 2019/0335490 A1 * | 10/2019 | Zeng ................. H04W 72/1268 |
| 2020/0100193 A1 * | 3/2020 | Cheng ................. H04W 52/146 |

FOREIGN PATENT DOCUMENTS

| WO | WO-2019070181 A1 * | 4/2019 |
| WO | 2020/139177 A1 | 7/2020 |

OTHER PUBLICATIONS

CMCC, "Discussions On Enhancements to Support NR Backhaul Links", R1-1812878, 3GPP TSG RAN WG1 Meeting #95, Spokane, USA, Nov. 3, 2018, See Sections 2.2-3.

\* cited by examiner

*Primary Examiner* — Michael A Keller
(74) *Attorney, Agent, or Firm* — BRYAN CAVE LEIGHTON PAISNER LLP

(57) ABSTRACT

The present disclosure proposes a power headroom report method and a device using the same method. A method for performing a power headroom report (PHR) procedure by a first wireless device according to an embodiment of the present disclosure comprises: receiving PHR information from a second wireless device, the PHR configuration information providing a first timer value of a first periodic timer and a second timer value of a second periodic timer; and triggering the PHR procedure on the basis of the expiration of at least one of the first periodic timer and the second periodic timer, wherein the first timer value comprises a transmission period of a synchronization signal block transmitted by the second wireless device, and the first timer value is smaller than the second timer value.

14 Claims, 27 Drawing Sheets

(51) Int. Cl.
*H04W 56/00* (2009.01)
*H04W 72/0457* (2023.01)

(58) Field of Classification Search
CPC ... H04W 52/34; H04W 52/36; H04W 56/001; H04W 84/04; H04W 72/232; H04W 84/047; H04L 5/14; H04L 5/0053; H04L 5/0078; H04L 5/0023
See application file for complete search history.

POWER HEADROOM REPORT METHOD

CROSS-REFERENCE TO RELATED APPLICATIONS

This application is the National Stage filing under 35 U.S.C. § 371 of International Application No. PCT/KR2021/010432, filed on Aug. 6, 2021, which claims the benefit of Korean Patent Application No. 10-2020-0098523, filed on Aug. 6, 2020 the contents of which are all hereby incorporated by reference herein in their entirety.

TECHNICAL FIELD

The present disclosure relates to wireless communication.

BACKGROUND

One potential technology aimed at enabling future cellular network deployment scenarios and applications is support for wireless backhaul and relay links. This enables flexible and highly dense deployment of NR cells without the need to proportionally densify the transport network.

It is expected that greater bandwidth in NR compared to LTE with the native deployment of massive MIMO or multi-beam systems will be available. Thus (e.g., mmWave spectrum) creates opportunities for the development and deployment of integrated access and backhaul links. This makes it easier for a deployment of a dense network of self-backhauled NR cells in a more integrated manner by establishing multiple control and data channels/procedures defined to provide access or access to the terminals. Such systems are referred to as integrated access and backhaul links (IAB).

SUMMARY

The present specification proposes a power headroom report method more suitable for a next-generation communication system, and an apparatus using the method.

According to the present specification, a power headroom report and a power control can be performed more accurately in a next-generation communication system capable of simultaneously performing uplink transmission and reception and downlink transmission and reception.

Effects that can be obtained through a specific example of the present specification are not limited to the aforementioned effects. For example, there may be various technical effects that can be understood or derived by a person having ordinary skill in the related art from the present specification. Accordingly, specific effects of the present specification are not limited to those explicitly described in the present specification, and may include various effects that can be understood or derived from technical features of the present specification.

BRIEF DESCRIPTION OF THE DRAWINGS

The following drawings were created to explain a specific example of the present specification. Since the names of specific devices described in the drawings or the names of specific signals/messages/fields are presented by way of example, the technical features of the present specification are not limited to the specific names used in the following drawings.

DETAILED DESCRIPTION

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B".

Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features individually described within a drawing in the present disclosure may be implemented individually or may be implemented simultaneously.

Figure 1:
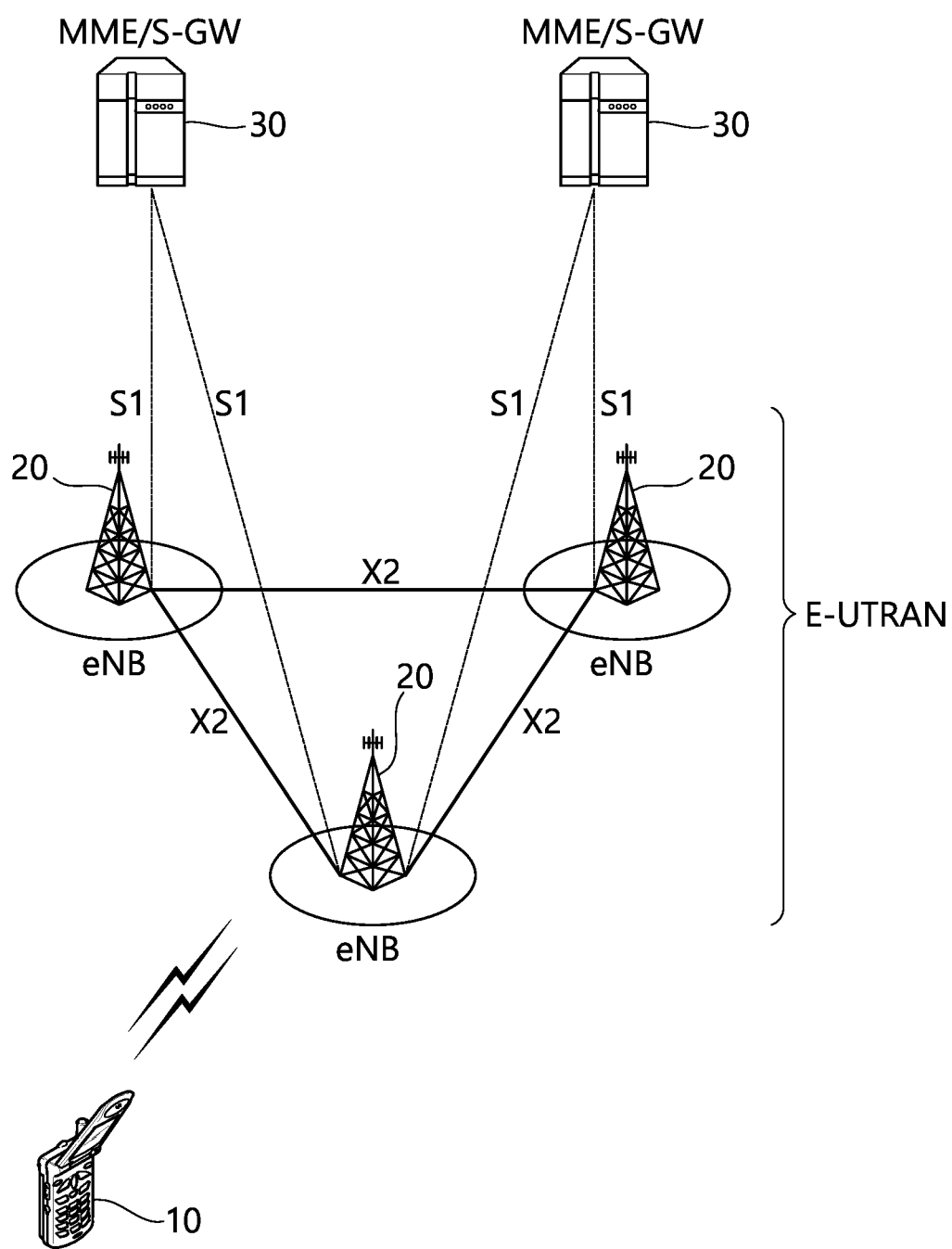
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
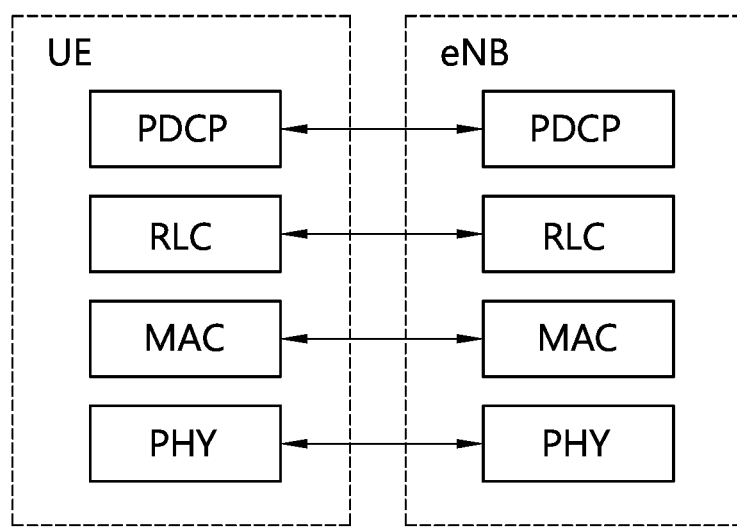
FIG. 2 is a diagram showing a wireless protocol architecture for a user plane.
Figure 3:
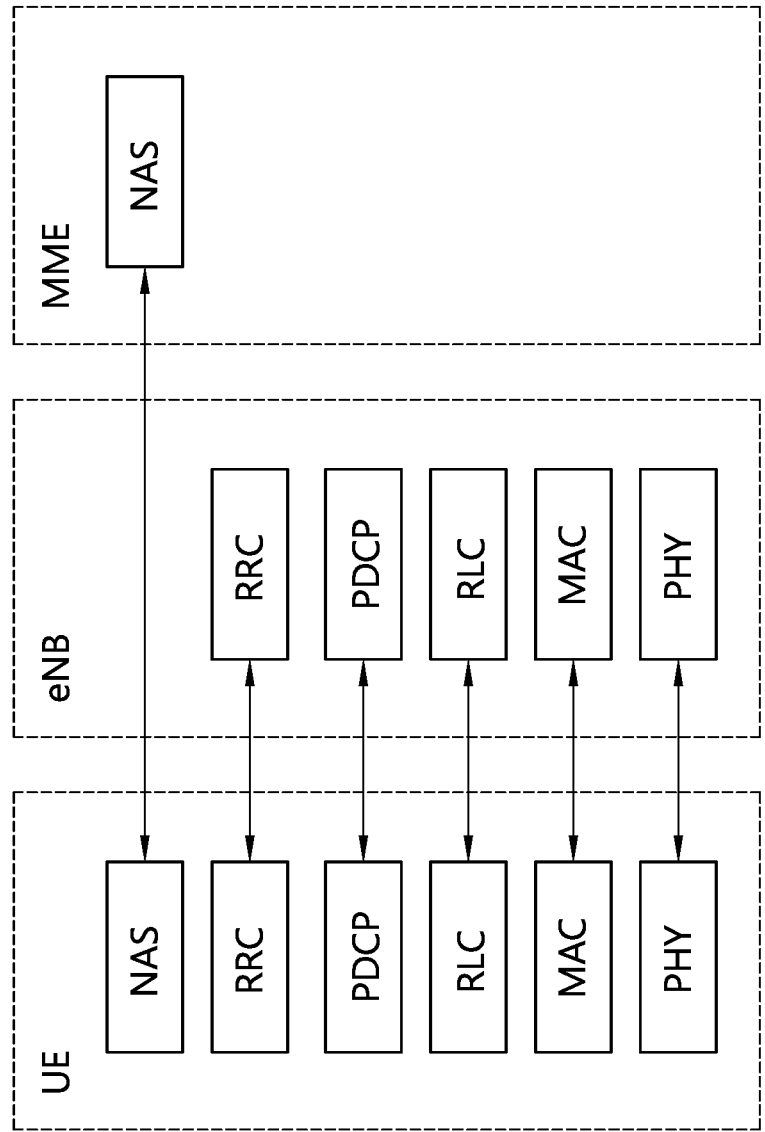
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission, e.g., a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
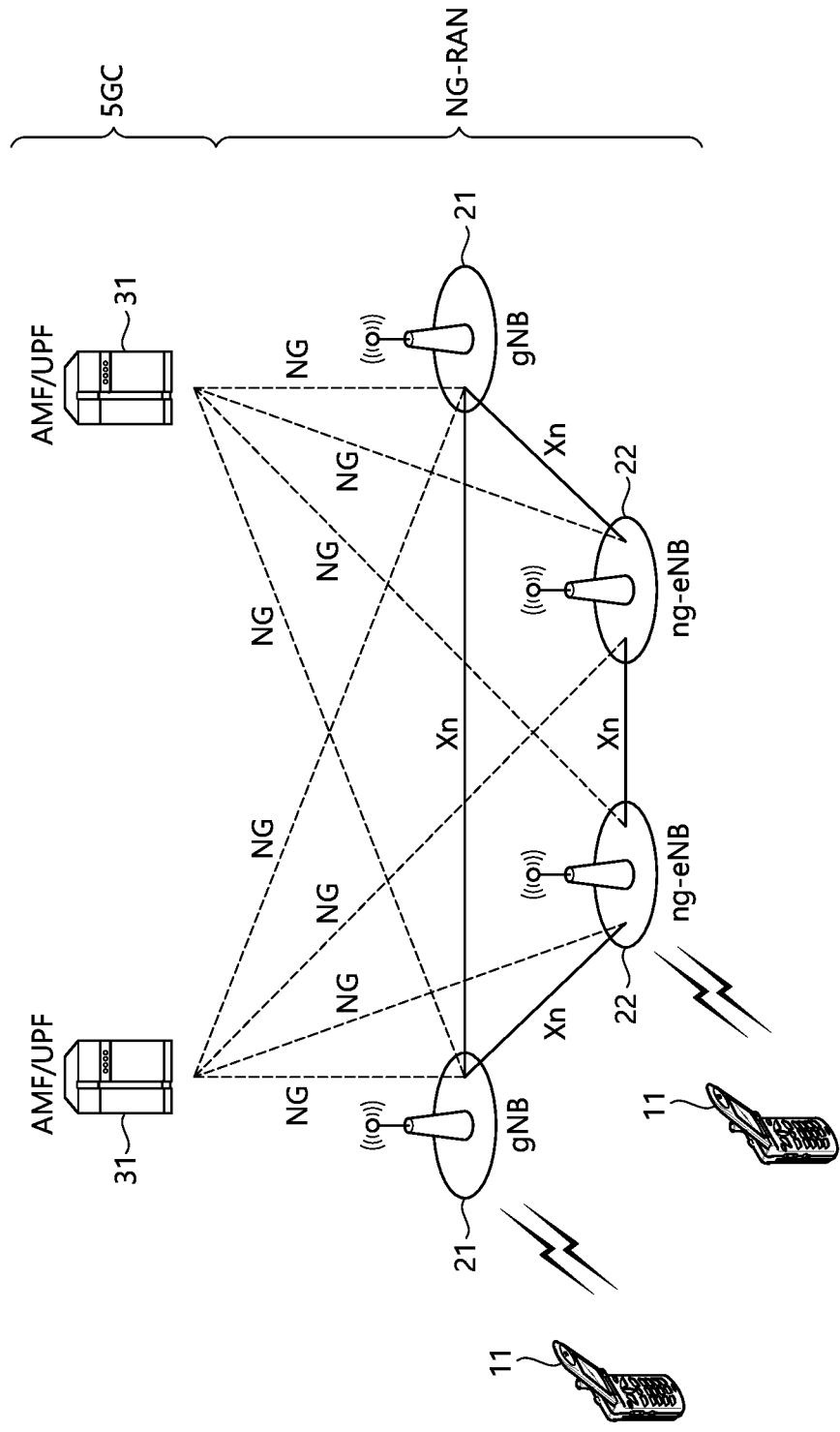
FIG. 4 shows another example of a wireless communication system to which the technical features of the present disclosure can be applied.

FIG. 4 shows another wireless communication system to which the present disclosure may be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5th generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and a control plane protocol termination towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
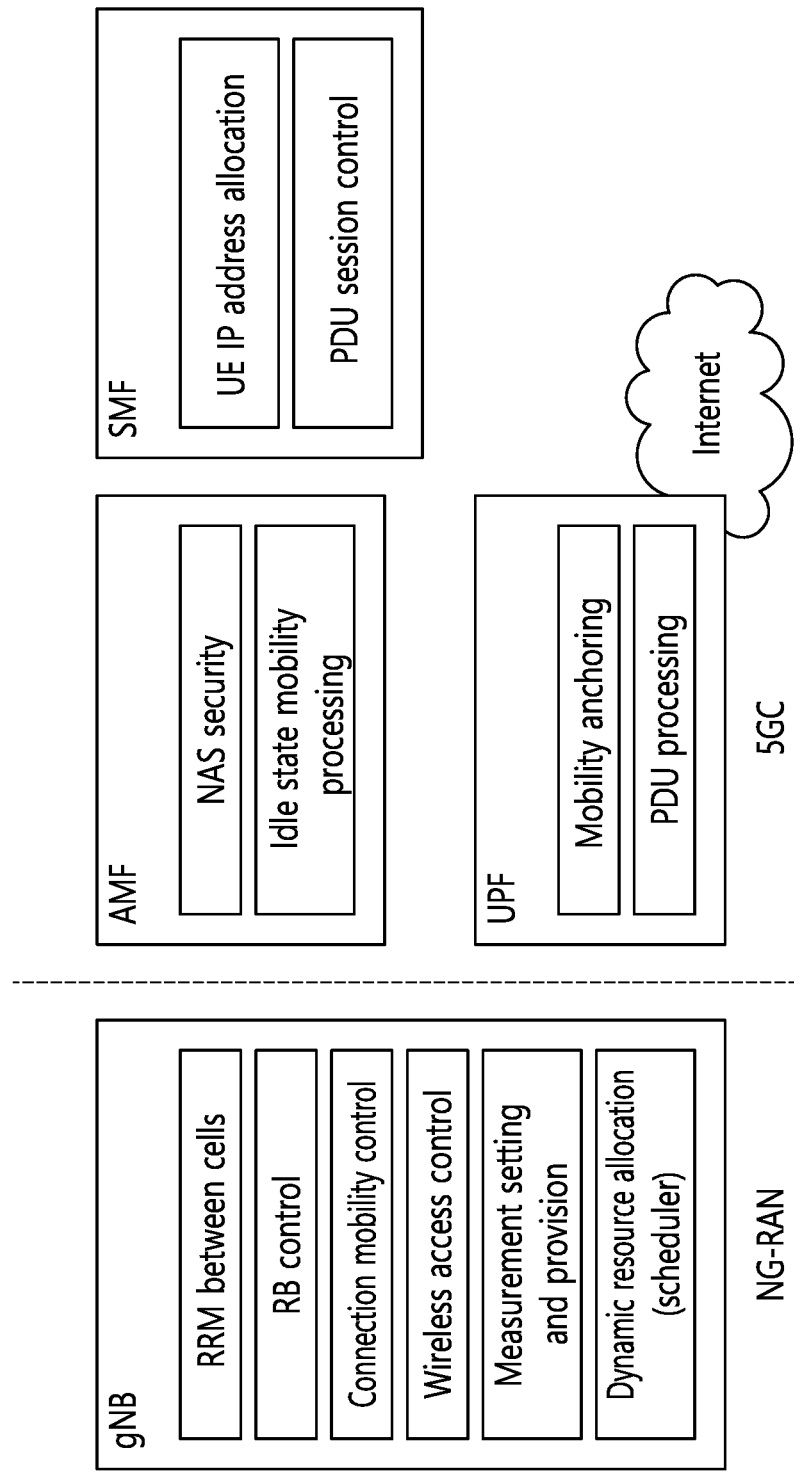
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
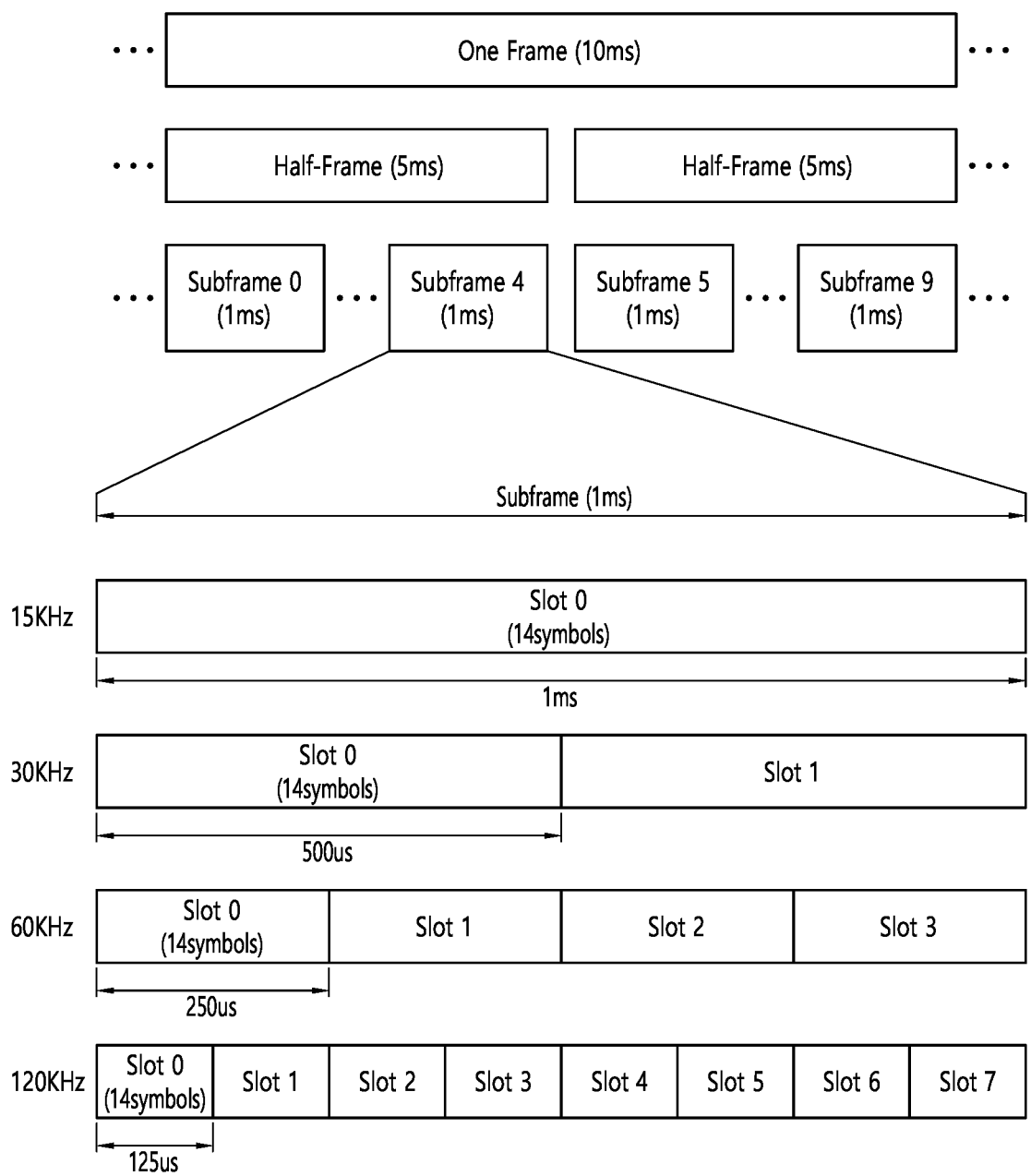
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in a subframe according to subcarrier spacings.

The following table 1 illustrates a subcarrier spacing configuration μ.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS(15*2^μ) | $N^{slot}_{symb}$ | $N^{frame, u}_{slot}$ | $N^{subframe, u}_{slot}$ |
|---|---|---|---|
| 60 KHz (μ = 2) | 12 | 40 | 4 |

NR supports multiple numbers (or subcarrier spacing (SCS)) to support various 5G services. For example, when the SCS is 15 kHz, a wide region in the legacy cellular band is supported; and when the SCS is 30 kHz/60 kHz, dense urban areas, low time delay and wide carrier bandwidth are supported; and when the SCS is 60 kHz or more, a bandwidth of more than 24.25 GHz is supported in order to overcome phase noise.

The NR frequency band may be defined as two types of frequency ranges (FR1 and FR2). A numerical value of the frequency range may be changed and, for example, the two types of frequency ranges (FR1 and FR2) may be as shown in Table 4 below. For convenience of explanation, among the frequency ranges used in the NR system, FR1 may refer to "sub 6 GHz range" and FR2 may refer to "above 6 GHz range" and may be called millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range of the NR system may be changed. For example, FR1 may include a band of 410 MHz to 7125 MHz as shown in Table 5 below. That is, FR1 may include a frequency band of 6 GHz (or 5850, 5900, 5925 MHz, etc.) or higher. For example, the frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One potential technology aimed at enabling future cellular network deployment scenarios and applications is support for wireless backhaul and relay links. This enables flexible and highly dense deployment of NR cells without the need to proportionally densify the transport network.

It is expected that greater bandwidth in NR compared to LTE with the native deployment of massive MIMO or multi-beam systems will be available. Thus (e.g., mmWave spectrum) creates opportunities for the development and deployment of integrated access and backhaul links. This makes it easier for a deployment of a dense network of self-backhauled NR cells in a more integrated manner by establishing multiple control and data channels/procedures defined to provide access or access to terminals. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 7:
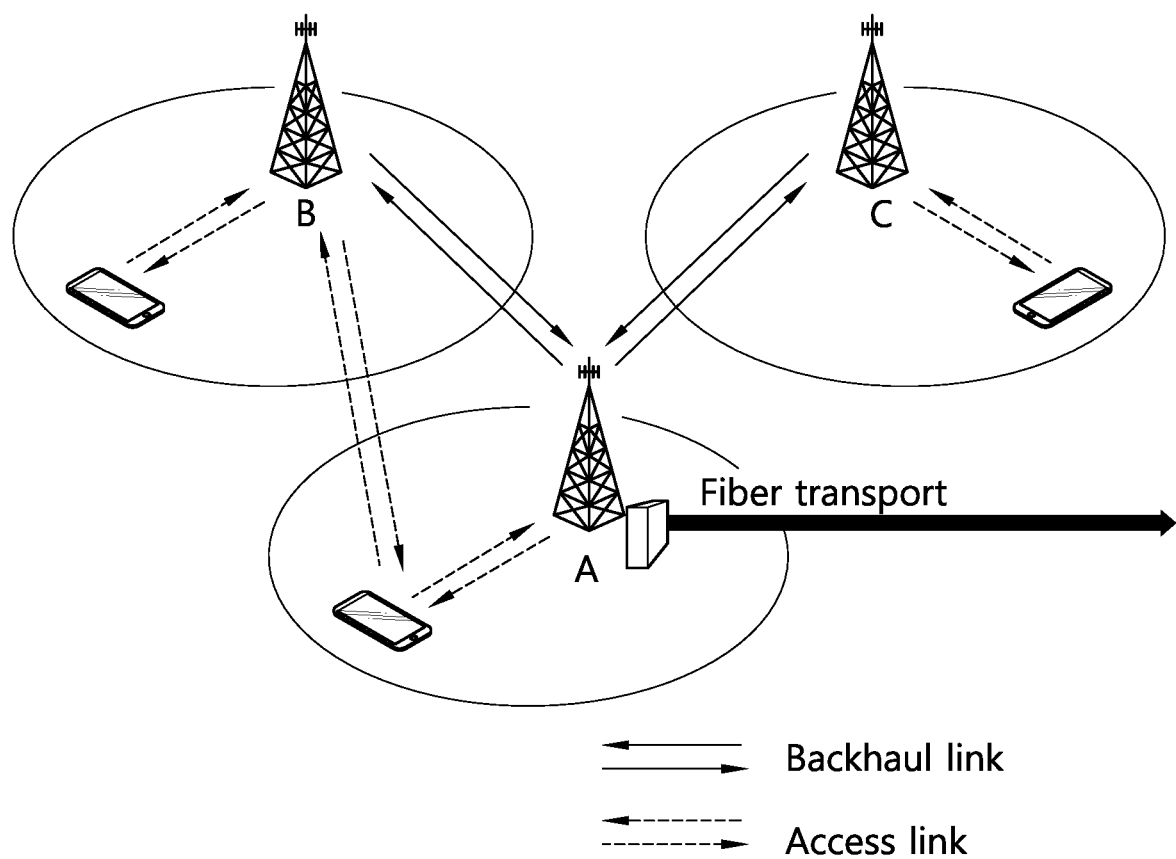
FIG. 7 schematically illustrates an example for a network with integrated access and backhaul links (IAB).

FIG. 7 schematically illustrates an example for a network with integrated access and backhaul links (IAB).

According to FIG. 7, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Although efficient support of out-of-band relays is important for some NR deployment scenarios, it is very important to understand the requirements of in-band operation, which implies tight interworking with access links operating on the same frequency to accommodate duplex restrictions and avoid/mitigate interference.

Furthermore, operating an NR system in the millimeter wave spectrum have some unique challenges. It involves experiencing severe short-term blocking that cannot be easily mitigated by the current RRC-based handover mechanism due to the larger time scale required for completion of the procedure compared to short blocking. Overcoming short blocking in mmWave systems may require a fast RAN-based mechanism for switching between rTRPs that does not necessarily require the inclusion of a core network. The aforementioned need for mitigation of short blocking for NR operation in the millimeter wave spectrum, along with the need for easier deployment of self-backhauled NR cells, creates a need for the development of an integrated framework that allows for fast switching of access and backhaul links. Over-the-air (OTA) coordination between rTRPs may also be considered to mitigate interference and support end-to-end path selection and optimization.

The following requirements and aspects shall be addressed by the IAB for NR:

Efficient and flexible operation for in-band and out-of-band relaying in indoor and outdoor scenarios Multi-hop and redundant connections End-to-end path selection and optimization Support of backhaul links with high spectral efficiency Support of legacy NR UEs Legacy NR is designed to support half-duplex devices. As such, half-duplex may be supported and worthy of being targeted in an IAB scenario. Furthermore, IAB devices having a full duplex may also be considered.

Figure 8:
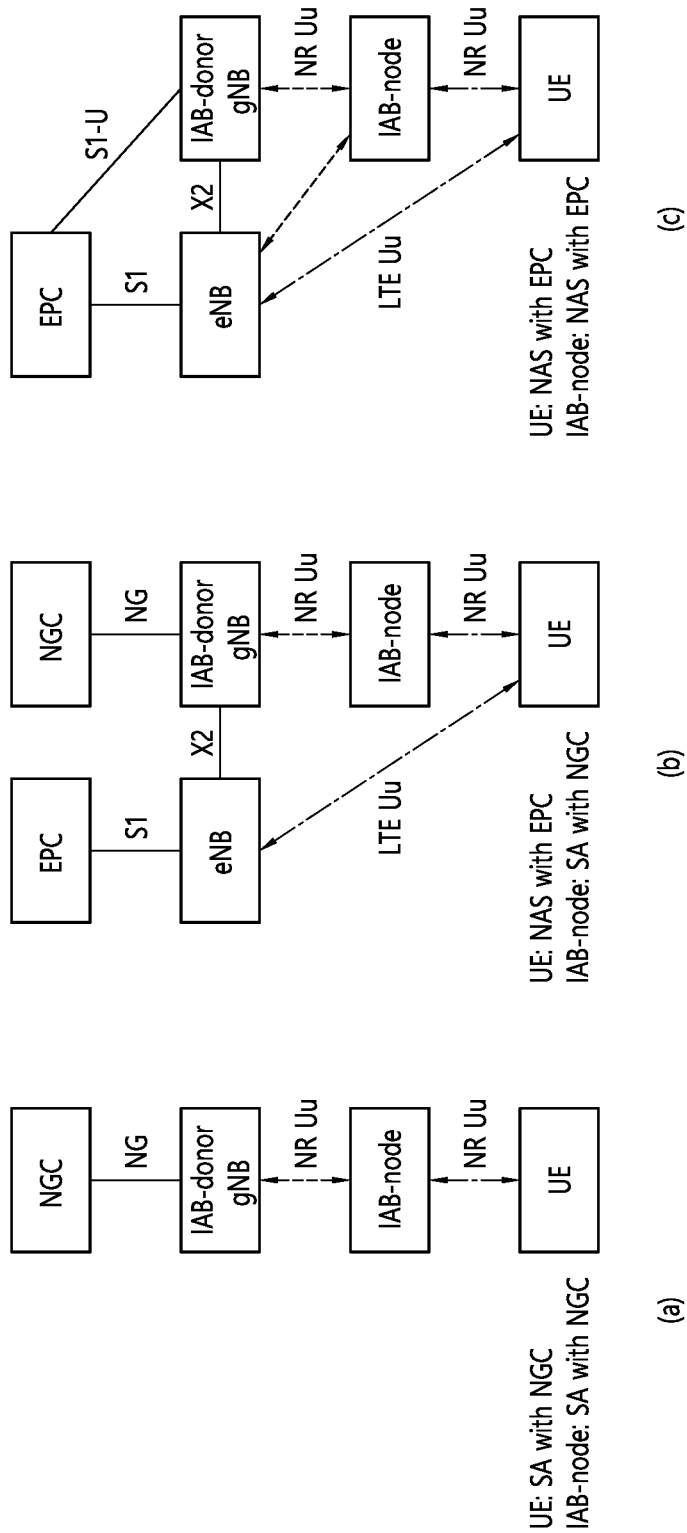
FIG. 8 shows an example of an operation of an IAB system in a standalone (SA) mode and a non-standalone (NSA) mode.

FIG. 8 shows an example of the operation of the IAB system in a standalone (SA) mode and a non-standalone (NSA) mode. Specifically, (a) of FIG. 8 shows an example of the operation of the UE and IAB node considering NGC in SA mode, (b) of FIG. 8 shows an example of the operation of the IAB node considering NGC in SA mode and the UE considering EPC in NSA mode, (c) of FIG. 8 shows an example of the operation of the UE and IAB node considering EPC in the NSA mode.

The IAB node may operate in SA mode or NSA mode. When operating in NSA mode, the IAB node uses only the NR link for backhauling. A UE connected to the IAB node may select an operation mode different from that of the IAB node. The UE may further connect to a different type of core network than the connected IAB node. In this case, (e) DECOR ((enhanced) dedicated core network) or slicing may be used for CN selection. An IAB node operating in NSA mode may be connected to the same or different eNB(s). UEs operating in the NSA mode may be connected to the same or different eNB from the IAB node to which they are connected. FIG. 8 shows an example in consideration of NGC in SA mode and an example in consideration of EPC in NSA mode.

In the IAB scenario, if each relay node (RN) does not have the scheduling capability, the donor gNB (DgNB) shall schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 9:
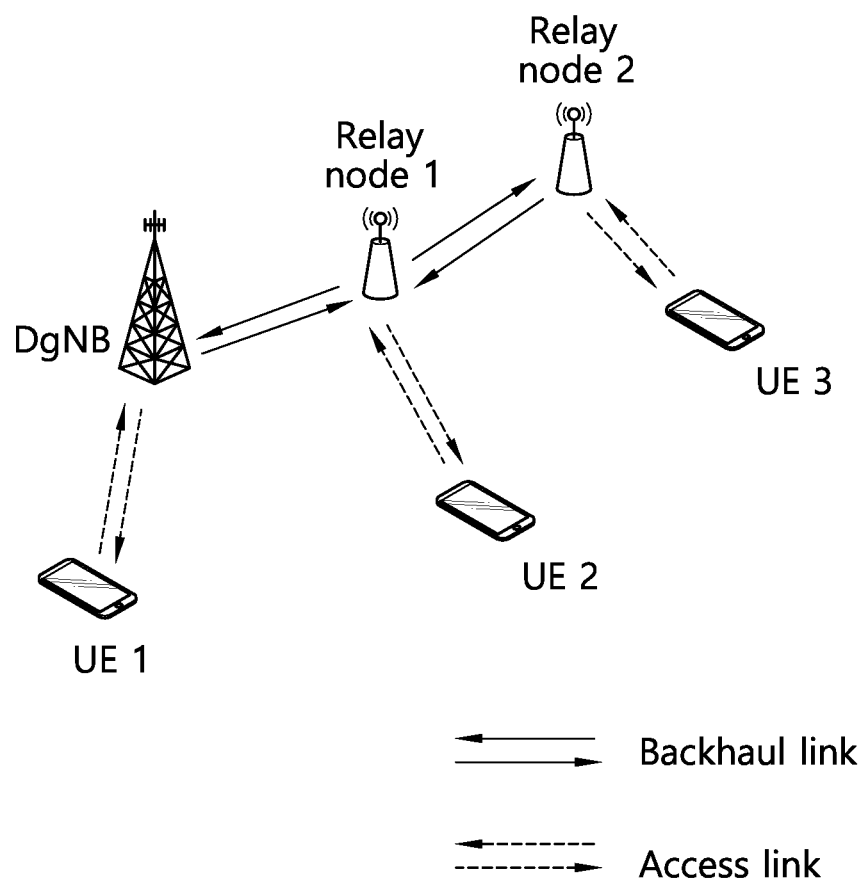
FIG. 9 schematically illustrates an example of a configuration of access and backhaul links.

FIG. 9 schematically illustrates an example of a configuration of access and backhaul links.

FIG. 9 shows an example in which a backhaul link and an access link are configured when a DgNB and an IAB relay node (RN) are present. The DgNB and RN1 connect the backhaul link, and RN2 connects the backhaul link to the RN1. The DgNB and UE1 connect the access link, the RN1 and UE2 connect the access link, and the RN2 and UE3 connect the access link.

According to FIG. 9, the DgNB not only receives a scheduling request from the UE 1, but also receives scheduling requests from the UE 2 and UE 3. Then, the DgNB makes a scheduling decision of the two backhaul links and the three access links, and informs the scheduling results. Therefore, such centralized scheduling involves scheduling delays and causes latency problems.

On the other hand, distributed scheduling can be performed if each relay node has scheduling capability. Then, immediate scheduling for the uplink scheduling request of the UE can be performed, and the backhaul/access links can be used more flexibly by reflecting the surrounding traffic situation.

Figure 10:
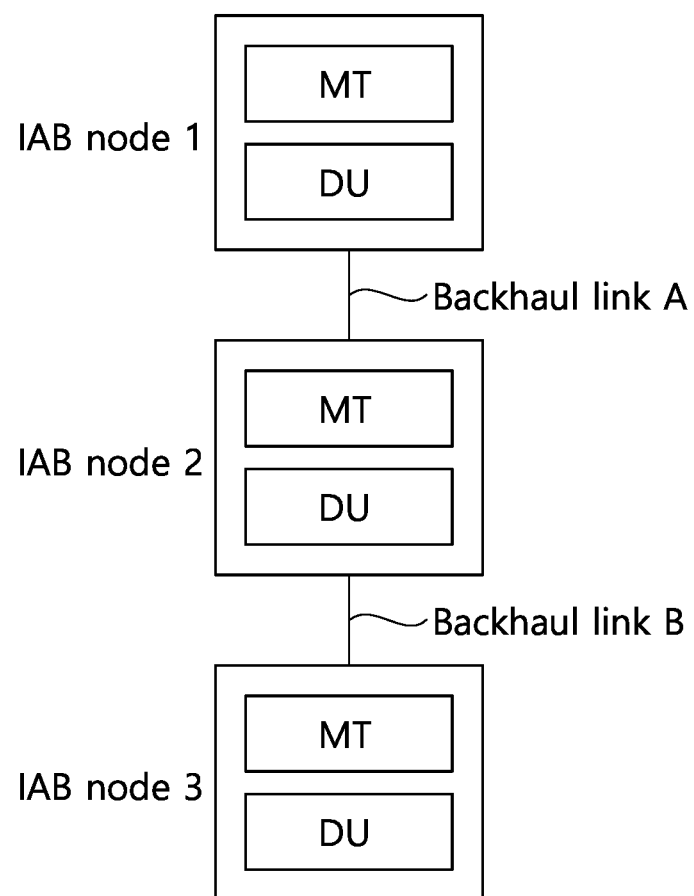
FIG. 10 explains links and relationships between IAB nodes.

FIG. 10 explains links and relationships between IAB nodes.

Referring to FIG. 10, IAB node 1 is connected to IAB node 2 through a backhaul link A. For the backhaul link A, the IAB node 1 is the parent node of the IAB node 2, and the IAB node 2 is a child node of the IAB node 1. In addition, the IAB node 2 is connected to the IAB node 3 through a backhaul link B, and the IAB node 2 is a parent node of the IAB node 3 and the IAB node 3 is a child node of the IAB node 2 for the backhaul link B.

Here, each of the IAB nodes may perform two functions. One is Mobile Termination (MT), which maintains a wireless backhaul connection to an upper IAB node or donor node. And, the other is a DU (distributed unit), which provides access connection with UEs or connection with the MT of a lower IAB node.

For example, from the point of view of the IAB node 2, the DU of IAB node 2 is functionally connected to the MT of IAB node 3 on the backhaul link B, and at the same time, the MT of IAB node 2 is functionally connected to the DU of IAB node 1 on the backhaul link A. Here, the child link of the DU of IAB node 2 may mean the backhaul link B between the IAB node 2 and IAB node 3. Also, here, the parent link of the MT of the IAB node 2 may mean the backhaul link A between the IAB node 2 and the IAB node 1.

Hereinafter, methods proposed in the present specification are described.

MT transmit power of an IAB node is indicated by a DU of a parent IAB node by considering MT capability and regulation, and DU transmit power of the IAB node is determined by the IAB node. Therefore, there is no problem when different time resources are used in transmission. However, in a case where the MT and DU in a single IAB node perform transmission at the same time, that is, in case of simultaneous transmission of the MT and DU in the IAB node, both the MT and the DU may not be able to use intended transmit power due to limitations and restrictions of elements, insufficient transmit power, or the like. The case of simultaneous transmission of the MT and DU in the IAB node may be divided into a case where the MT and the DU do not support power sharing and a case where the MT and the DU support power sharing.

(In the first case: the case where the MT and the DU do not support power sharing) The IAB node may drop transmission of the MT or DU. Alternatively, when the IAB node is not able to perform transmission based on configured power, transmission of both the MT and the DU may be dropped. In this case, since the MT and the DU are not able to recognize in advance the occurrence of such a situation (e.g., transmission drop), it may not be possible to deal with this situation. Even if the occurrence of the situation is recognized, since scheduling of the IAB node MT is performed by a parent node DU of the IAB node MT, the IAB node MT cannot change the scheduling. Therefore, since only the IAB node DU is able to perform scheduling, a method of compensating for the transmission drop of the MT and DU may be limited. As a result, when the occurrence of the situation is avoided through scheduling, the MT may eventually preoccupy a resource. Accordingly, a signal, such as a synchronization signal block (SSB), a channel state information-reference signal (CSI-RS), or the like, expected to be received with constant power at a pre-set period by a UE may be missing, or reception quality of the signal may be degraded. In order to avoid this situation, the resource of the IAB node MT shall be scheduled not to collide with another resource. Only a parent IAB node DU of the IAB node MT may perform the scheduling. Therefore, when a child IAB node performs simultaneous transmission, the parent IAB node DU needs to obtain transmit power information of the MT and DU of the child IAB node in advance. Accordingly, the present specification proposes a power headroom report (PHR) procedure/method including transmit power of the IAB node DU.

(In the second case: the case where the MT and the DU support power sharing) The IAB node may allocate power based on a pre-agreed rule in case of simultaneous transmission of the MT and DU. Power sharing of the IAB node may be an operation of sharing and distributing transmit power in a unit time in which the MT and the DU perform simultaneous transmission. The power sharing may include the aforementioned transmission drop operation of the MT and/or DU. Unlike the first case, the MT and the DU are able to perform simultaneous transmission in the second case by using all power to be transmitted, when a total sum of power to be transmitted by the MT and the DU is within an available range. However, less transmit power than indicated transmit power may be allocated to the MT. In addition, the DU may not be able to perform transmission with the intended transmit power. That is, for a time resource in which transmission of the MT overlaps with transmission of the DU, individual transmission of the MT and DU may require more power than a total sum of power that can be transmitted by the IAB node. Herein, transmission of the MT and DU may be dropped in part or entirely. In addition, a signal expected to be received in a receiving end may be missing, or reception quality may be degraded. In order to avoid this situation, a method of predicting transmit power of the MT and DU is required.

A power headroom report (PHR) procedure is a procedure used by a BS to obtain power availability information of a UE. The same PHR procedure as the existing UE may be applied to an MT of an IAB node operating with time division multiplexing (TDM). On the other hand, if there is a DU in a no-TDM relationship with the MT, that is, if the MT and the DU perform simultaneous transmission, the PHR procedure for the IAB node MT needs to be changed. Maximum transmit power of the MT may be determined based on regulations, hardware limitations, or the like. In addition, maximum transmit power of the DU may also be determined based on regulations, hardware limitations, or the like. However, maximum transmit power of the IAB, in particular, maximum transmit power of the IAB node including the MT and DU in the no-TDM relationship, may be a smaller value than a sum of the maximum transmit power of the MT and the maximum transmit power of the DU. That is, if the MT calculates a power headroom in the same manner as in the existing UE, an actual power headroom value may be smaller than the calculated power headroom value due to transmit power of the DU at that time. Therefore, an IAB system requires a PHR method considering the DU. The present specification proposes the PHR method of the IAB node based on the aforementioned description.

Meanwhile, in the present specification, the maximum transmit power of the MT may be denoted by PMT. In addition, in the present specification, the maximum transmit power of the DU may be denoted by $P_{DU}$. In addition, in the present specification, the maximum transmit power of the IAB node may be denoted by $P_{IAB}$.

Figure 11:
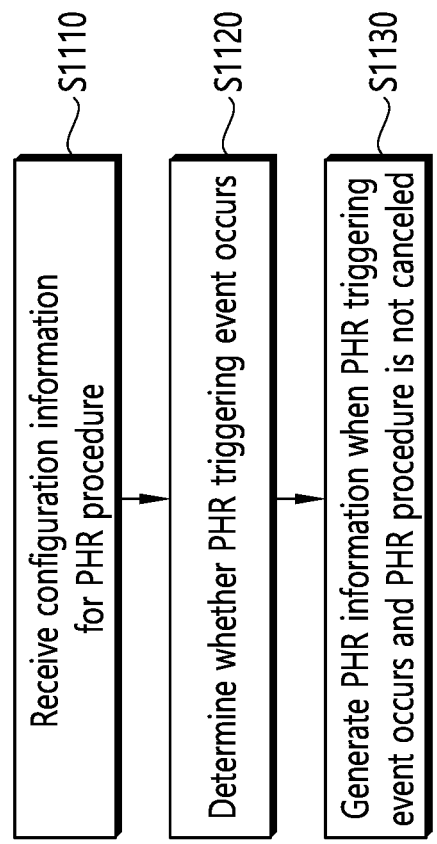
FIG. 11 is a flowchart for an example of a PHR procedure.

FIG. 11 is a flowchart for an example of a PHR procedure.

Referring to FIG. 11, an IAB node receives configuration information for the PHR procedure (S1110). Herein, the IAB node may be a DU and/or MT of the IAB node. In addition, the configuration information for the PHR procedure may be transmitted by a parent node of the IAB node. In addition, the configuration information for the PHR procedure may be transmitted through an F1-application protocol (AP), MAC, RRC messages, or the like.

In addition, the IAB node determines whether a PHR triggering event occurs (S1120). Herein, the triggering event may include: (1) expiration of phr-PeriodicTimer; (2) expiration of phr-ProhibitTimer; and when a change in a pathloss value of an associated activated serving cell is greater than a set value, (3) addition of a PSCell, or the like.

In addition, the IAB node generates PHR information when the PHR triggering event occurs and the PHR procedure is not canceled (S1130). The IAB node may transmit the generated PHR information to a related receiving end.

Meanwhile, in the present specification, the PHR procedure may mean a PHR procedure disclosed in a standard such as 3rd generation partnership project (3GPP) or the like.

Meanwhile, an environment of simultaneous transmission of a DU and MT in an IAB node is assumed in the description of the present specification. In addition, an environment in which the IAB node DU and MT are in a no-TDM relationship is assumed in the description of the present specification. However, in an environment in which the DU and the MT are in a TDM relationship, since simultaneous transmission of the DU and MT may be allowed according to an H/S/NA configuration (e.g., information indicating whether a specific resource is hard, soft, or not available (NA)) and an availability indication (AI) configuration, the description of the present specification may also be applied to the environment in which the DU and the MT are in the TDM relationship. In addition, the PHR procedure may include a type-1 PH report ((only) physical uplink shared channel (PUSCH)), a type-2 PH report (physical uplink shared channel (PUSCH) and physical uplink control channel (PUCCH)), and a type-3 PH report (sounding reference signal (SRS)).

For example, the PHR procedure may be used to provide information described below to a serving BS.

Type-1 PH: the difference between the nominal UE maximum transmit power and the estimated power for UL-SCH transmission per activated serving cell Type-2 PH: the difference between the nominal UE maximum transmit power and the estimated power for UL-SCH and PUCCH transmission on SpCell of the other MAC entity (i.e., E-UTRA MAC entity in EN-DC, NE-DC, and NGEN-DC cases)

Type-3 PH: the difference between the nominal UE maximum transmit power and the estimated power for SRS transmission per activated serving cell In the present specification, the existing PHR procedure may include all types of the aforementioned PHR procedures. In addition, the PHR procedure proposed in the present specification may be a modification of the aforementioned existing PHR procedure or a new type of a PHR procedure (e.g., a type-4 PH report for simultaneous transmission of the IAB node MT and the IAB node DU, or the like).

When the MT and DU in the IAB node perform simultaneous transmission due to the no-TDM relationship or the like, PHR information reported by the IAB node MT does not include information on transmit power of the IAB node DU included in the same IAB node, and thus may be incorrect. Methods proposed in the present specification may prevent a technical problem in that the PHR information is incorrect due to the simultaneous transmission of the MT and DU.

Herein, a PHR method for an IAB node performing simultaneous transmission proposed through the present specification will be described.

UE configured maximum output power disposed in the 3GPP standard is denoted by Pcmax in the present specification. Pcmax may also denote configured maximum UE output power or configured maximum output power. Pcmax may be a value configured within a specific range by an IAB node or a UE, based on a value (e.g., a value P provided from a network and a value depending on a power class of the UE, or the like. The existing PHR value may be calculated with a formula of PHR=Pcmax−{UE configured power}. Herein, the UE configured power may be current transmit power calculated by considering a pathloss, a normal power value of corresponding transmission, or the like. Information reported through the PHR procedure (or PHR information) may include: (1) the Pcmax value; and (2) a power headroom (PH), i.e., a PHR value. Therefore, the present specification proposes a method of changing only Pcmax, a method of changing only the PHR value, and a method of changing both the Pcmax and the PHR value.

(Method 1.1) PHR Method of Changing Pcmax

When an IAB node MT reports PHR information to a parent IAB node, the IAB node MT may explicitly/implicitly report that the IAB node performs simultaneous transmission by changing only Pcmax in the exiting PHR information. In this case, the PHR procedure may report in the same manner as in the existing PHR procedure irrespective of a type (i.e., type 1, type 2, or type 3). The method 1.1 may include a method of reporting a single Pcmax value and a method of reporting two Pcmax values.

(Method 1.1.1) PHR Method Using Changed Single Pcmax

UE configured maximum output power for a case where an IAB node uses a resource alone may be denoted by legacy Pcmax. Herein, when an IAB node MT performing simultaneous transmission together with an IAB node DU reports PHR information, the IAB node may calculate a PHR value by using the legacy Pcmax value, and may report UE configured maximum output power to be reported together as a new value (the new value is denoted by Pcmax') other than the legacy Pcmax. The method is compatible with the existing PHR procedure in terms of triggering of the PHR procedure. For example, the PHR procedure may be triggered when a current report and a previous report exceed a predefined threshold. Herein, when only the PHR value changes, a parent IAB node may determine that a channel between a parent IAB node DU and a child IAB node MT thereof deteriorates due to a change in a pathloss or the like, based on a change in the PHR value. Hereinafter, in order to report that the child IAB node MT will perform a simultaneous transmission operation while preventing the aforementioned ambiguity from occurring, methods in which the child IAB node MT replaces Pcmax with Pcmax' to perform the PHR procedure will be proposed.

(Example 1) The IAB node may determine the reported Pcmax' value to be smaller than the legacy Pcmax value. That is, the IAB node may report a value obtained by subtracting a delta from the legacy Pcmax value as Pcmax' (Pcmax'=Pcmax−delta). Herein, delta may be instantaneous configured output power of the IAB node DU. The instantaneous configured output power of the IAB node DU may be a predetermined value. Alternatively, the instantaneous configured output power of the IAB node DU may be an average value of transmitted output power of the configured output power or transmitted output power of the IAB node DU used in a time/frequency resource of a specific time duration. Alternatively, the instantaneous configured output power of the IAB node DU may be a margin.

(Example 2) The IAB node may fix the reported Pcmax' to a predefined value. Herein, one or more values of the legacy Pcmax value may be reserved. A parent IAB node DU which has received the reserved value may expect that a child IAB node MT thereof will perform a simultaneous transmission operation together with the child IAB node DU. For example, when the child IAB node MT reports a value indicating −29 dBm or less (e.g., PCMAX_C_00 predetermined in the 3GPP standard) or a value indicating 33 dBm or more (e.g., PCMAX_C_63 predetermined in the 3GPP standard), a parent IAB node of the child IAB node may expect that a child IAB node MT thereof will perform the simultaneous transmission operation. Herein, the reserved value may be set to a value other than the existing value.

(Example 3) The IAB node may limit the reported Pcmax' to a specific range. A parent IAB node DU which has received the value of the limited range may expect that a child IAB node MT thereof will perform a simultaneous transmission operation together with the DU of the child IAB node. For example, when the parent IAB node knows a power class of a child IAB node MT thereof in advance, if the child IAB node MT reports Pcmax exceeding maximum output power thereof, the parent IAB node may expect that the child IAB node MT and a DU of the child IAB node will perform the simultaneous transmission operation.

When applying the aforementioned method, that is, a method of reporting the legacy Pcmax by replacing with Pcmax', the parent IAB node DU may have difficulty in accurately recognizing maximum output power of the child IAB node MT. Accordingly, the parent IAB node DU may determine maximum output power for a corresponding time duration of the child IAB node MT by referring to Pcmax of an immediately previous report or Pcmax of previous all reports.

(Method 1.1.2) PHR Method Using Multiple Pcmax Values

When the IAB node MT for performing simultaneous transmission together with the IAB node DU performs the PHR procedure, the IAB node MT may calculate the PHR value by directly using the legacy Pcmax value, and may report both the legacy Pcmax and the new Pcmax' as UE configured maximum output power. Herein, when multiple Pcmax' values are used, the number of Pcmax' values may be equal to the number of IAB node DUs which use (or share) transmit power together with the IAB node MT. Hereinafter, although it is assumed that one IAB node DU uses (or shares) the transmit power together with the IAB node MT, the method may also be applied to a case where a plurality of IAB node DUs use (or share) the transmit power together with the IAB node MT. Pcmax' may be defined based on one of the three examples of the aforementioned method 1.1.1. In addition, the IAB node or UE performing the PHR procedure may report Pcmax and Pcmax' at the same time. Specifically, the IAB node or UE performing the PHR procedure may report Pcmax and Pcmax' in a time-divided manner. Hereinafter, reporting of the PHR value and Pcmax is denoted by PHR_report1, and reporting of the PHR and Pcmax' is denoted by PHR_report2. In this case, the method of reporting in the time-divided manner may be performed based on a predefined rule. Alternatively, the method of reporting in the time-divided manner may be performed based on information of a timetable or the like regarding which Pcmax is used at a predetermined time. The following examples may be considered.

(Example 1) After reporting the PHR_report1 (or PHR_report2), the PHR_report2 (or PHR_report1) may be reported as a predetermined time.

(Example 2) The PHR_report1 and the PHR_report2 may be reported consecutively.

When the PHR value of the PHR information received consecutively within a specific time is identical and UE configured maximum output power is different, the parent IAB node DU may determine that a child IAB node MT thereof performs a simultaneous transmission operation based on one of two PHR reports (i.e., PHR_report1 and PHR_report2).

Herein, the parent IAB node DU which has received the PHR information based on the aforementioned method may know that transmission of the PHR information is not triggered due to deterioration of a reception channel In addition, the parent IAB node DU which has received the PHR information based on the aforementioned information may recognize maximum output power of a child IAB node MT thereof. For example, the parent IAB node DU which has received the PHR information based on the aforementioned method may recognize maximum output power of a child IAB node MT thereof if delta is instantaneous configured output power of the child IAB node DU thereof.

(Method 1.2) PHR Method of Changing UE Configured Power

The PHR information in which only UE configured power is changed in the existing PHR procedure may implicitly/explicitly indicate that an IAB node performs a simultaneous transmission operation. That is, the PHR information to be reported together (in other words, PHR information in which only UE configured power is changed in the exiting PHR procedure) may include a Pcmax value of a case of using an IAB node MT alone and a changed PHR value. As described above, the existing PHR value is determined based on a method of subtracting the UE configured power from Pcmax irrespective of a type. Hereinafter, the existing PHR value is denoted by PHR1, and the changed PHR value is denoted by PHR2.

For example, the PHR1 may be determined based on PHR1=Pcmax-{UE configured power}. In addition, the PHR2 may be determined based on PHR2=Pcmax-{UE configured power}-{DU configured power}. That is, the PHR may be a value obtained by subtracting {UE configured power} and {DU configured power} from the Pcmax value.

Herein, similarly to the number of Pcmax' values of the method 1.1.2, the PHR2 may be determined based on the number of IAB node DUs which use transmit power together with the MT of the IAB node. Hereinafter, although it is assumed that one IAB node DU uses the transmit power together with the IAB node MT, the method proposed in the present specification may also be applied to a case where two or more IAB node DUs use the transmit power together with the IAB node MT. Herein, {DU configured power} may be transmit power expected to be used by the IAB node DU in a time duration in which a PHR value is calculated. {DU configured power} may be transmit power configured to the IAB node DU by a higher IAB node of the IAB node DU (e.g., a DU of a parent IAB node of the IAB node) or a central unit (CU) through F1AP signaling. An example of a method of calculating {DU configured power} is as follows.

(Example 1) instantaneous transmit power of IAB node DU of a corresponding time duration (Example 2) average transmit power used by IAB node DU according to a corresponding time duration and a previous time duration (Example 3) linear sum of entirety or part of transmit power of periodic signal (e.g., CSI-RS, SSB, etc.) of IAB node DU (Example 4) maximum transmit power based on power class of IAB node DU or maximum transmit power within a specific time window (Example 5) minimum transmit power when IAB node DU is not off or minimum transmit power within specific time window (Example 6) predetermined specific constant value (Example 7) value based on implementation The IAB node MT may report the PHR2 in a time-divided manner with respect to the PHR1. Alternatively, the IAB node MT may report only the PHR2. However, in case of reporting only the PHR2, when the IAB node DU drops transmission at a corresponding time, even if transmit power can be more allocated since it is not used by the IAB node DU, the IAB node MT may not use the transmit power that can be more allocated. The IAB node MT may report the PHR1 and the PHR2 in the same method as the method of reporting Pcmax and Pcmax' in a time divided manner as described above in the method 1.1.2. That is, the method of reporting in the time-divided manner may be performed based on a predefined rule. Alternatively, the method of reporting in the time-divided manner may be performed based on information of a timetable or the like regarding which PHR value is used at a predetermined time.

(Method 1.3) PHR Method of Changing Both Pcmax and UE Configured Power

Compared to the existing PHR information, PHR information in which both the Pcmax and the UE configured power are configured differently may explicitly/implicitly indicate that the IAB node (i.e., the MT and DU of the IAB node) performs simultaneous transmission. The methods 1 and 3 may include a method of reporting one piece of PHR information and a method of reporting a plurality of pieces of PHR information.

(Method 1.3.1) Method of Reporting One Piece of PHR Information

Pcmax used in the reporting of the PHR information may be determined based on one of examples of Pcmax' of the method 1.1.1. In addition, a PHR value used in the reporting of the PHR information may be determined based on one of examples of the PHR of the methods 1.2. The method 1.3.1 may be used when a parent IAB node DU knows that a child IAB node MT thereof performs a no-TDM operation or the child IAB node MT thereof performs simultaneous transmission.

(Method 1.3.2) Method of Reporting Plurality of Pieces of PHR Information

An IAB node MT may report to a parent IAB node DU both PHR information determined on the premise that the IAB node MT performs transmission alone and PHR information determined on the premise of a simultaneous transmission operation of the IAB node MT and an IAB node DU. The PHR information determined on the premise of simultaneous transmission may consider one of examples of the PHR value of the method 1.2. Herein, tow PHR values may be reported based on time division multiplexing (TDM), i.e., in a time-divided manner. In other words, that is, the method of reporting in the time-divided manner may be performed based on a predefined rule. Alternatively, the method of reporting in the time-divided manner may be performed based on information of a timetable or the like regarding which PHR value is used at a predetermined time.

Hereinafter, a method of triggering a PHR procedure proposed through the present specification will be described.

The existing PHR procedure may be triggered when the periodic PHR timer and/or the PHR inhibit timer expires. When a simultaneous transmission operation of the IAB node MT and IAB node DU is performed frequently, there is a need to frequently report PHR information. For example, the PHR information may be reported according to a transmission period of an SSB which is a representative periodic signal of the IAB node DU. Therefore, the present specification proposes a method of aligning a transmission period of PHR information and SSB. In addition, for more frequent transmission of the PHR information, the present specification proposes a method of adding a timer value of phr_PeriodicTimer and phr_ProhibitTimer as follows. Herein, phr_PeriodicTimer and phr_ProhibitTimer may be timers disclosed in the 3GPP standard, such as power headroom reporting or the like of the section 5.4.6 of TS 38.321 V16.1.0.

(Example 1) For matching an SSB transmission period, sf5, sf40, sf80, and sf160 may be added to a timer value of phr_PeriodicTimer and phr_ProhibitTimer.

(Example 2) For PHR information transmission more frequent than the SSB transmission period, sf1 may be added to a timer value of phr_PeriodicTimer.

In addition, the PHR procedure may be triggered when a difference between a current report and a previous report exceeds a threshold. However, when PHR information related to simultaneous transmission is reported according to one of examples of the aforementioned PHR information, the PHR information related to simultaneous transmission may be different from PHR information of transmission of an IAB node MT alone of a previous time. Herein, there may be an ambiguity problem in that an IAB node DU which receives the PHR report determines that a pathloss for a channel/link is changed for a child IAB node MT thereof. Therefore, when an IAB node changes the PHR information due to use of transmit power of the IAB node DU, information or indicators indicating that it is not the change of the pathloss may be transmitted based on a predefined rule. Alternatively, information indicating that it is not the change in the pathloss may be explicitly/implicitly indicated based on information such as a timetable regarding which PHR value will be used at a predetermined time.

Meanwhile, the aforementioned methods may also be applied to a UE, other than the IAB node.

Specifically, an IAB node MT may be functionally equivalent to a UE. Therefore, an entity to which the aforementioned method is applied may be changed to the UE. That is, the IAB node MT of the aforementioned method may be replaced with the UE, and the IAB node DU of the aforementioned method may be replaced with a BS (e.g., gNB). In particular, the UE may be a UE which performs full-duplex-based transmission and reception. Herein, the UE which performs the full-duplex-based transmission and reception may be a UE which performs transmission and reception at the same time. Herein, a transmission frequency band and a reception frequency band may overlap in part or entirely. Alternatively, even if the transmission frequency band and the reception frequency band do not overlap in part or entirely, the transmission frequency band may be adjacent to the reception frequency band.

When the aforementioned methods are applied to the UE which performs full-duplex-based transmission and reception, the following description may be applied.

For example, the aforementioned method may be a modification of an uplink PHR report in terms of the UE which performs full-duplex-based transmission and reception. Therefore, the UE which performs full-duplex-based transmission and reception may use PHR information as information for uplink power control. For example, in a time resource in which the UE performs full-duplex-based transmission and reception, when power of self-interference (SI) of the UE is high and thus power of a transmission signal shall be decreased due to deterioration of decoding performance of a reception signal, the aforementioned PHR procedure or PHR method may be applied to the UE to request for power reduction of the transmission signal. For example, a PHR value set to be small may be reported by changing Pcmax and/or configured power or the like in the duration in which the UE performs full-duplex-based transmission and reception. Alternatively, a method of triggering a PHR procedure proposed in the present specification may be applied for a time resource in which the UE performs full-duplex-based transmission and reception. That is, information on SI may be included in the PHR information.

Alternatively, the aforementioned method of triggering the PHR procedure proposed through the present specification may be applied to not the UE but a wireless device performing full-duplex-based transmission and reception. In particular, the method may be applied to a BS (e.g., gNB) performing full-duplex-based transmission and reception operations. Herein, the BS which performs the full-duplex-based transmission and reception operations may be a BS performing transmission and reception at the same time. Herein, a transmission frequency band and a reception frequency band may overlap in part or entirely. Alternatively, even if the transmission frequency band and the reception frequency band do not overlap in part or entirely, the transmission frequency band may be adjacent to the reception frequency band. For example, methods proposed through the present specification may be applied to a BS which uses a sub-band full duplex (SBFD)-based resource configuration and a single frequency full duplex (SFFD)-based resource configuration. The SBFD-based resource configuration and the SFFD-based resource configuration will be described with reference to FIG. 12 to FIG. 15.

Figure 12:
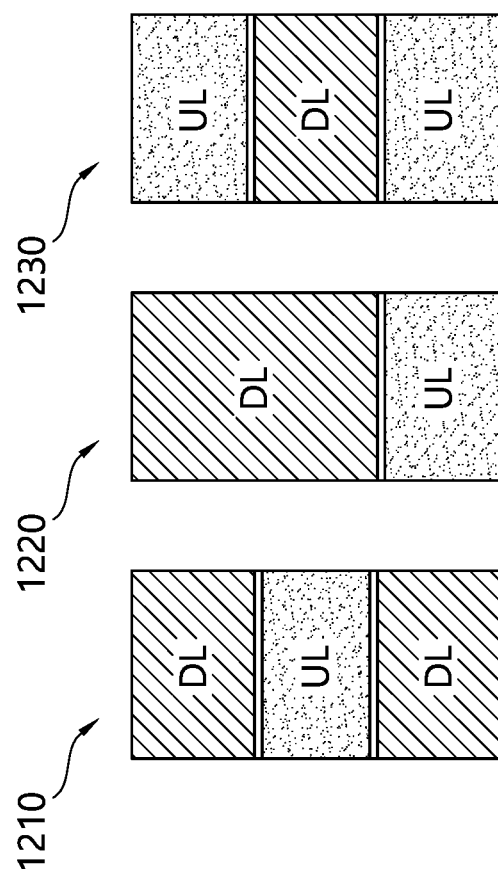
FIG. 12 illustrates a time-domain resource having an SBFD-based resource configuration.

FIG. 12 illustrates a time-domain resource having an SBFD-based resource configuration.

Specifically, an SBFD-based resource configuration in units of slots or symbols are illustrated in 1210, 1220, and 1230 of FIG. 12. In addition, a downlink sub-band frequency resource region is denoted by DL, and an uplink sub-band frequency resource region is denoted by UL.

Referring to FIG. 12, the downlink sub-band frequency resource region and the uplink sub-band frequency resource region may not overlap with each other. In addition, a guard band may be present between the downlink sub-band frequency resource region and the uplink sub-band frequency resource region.

Figure 13:
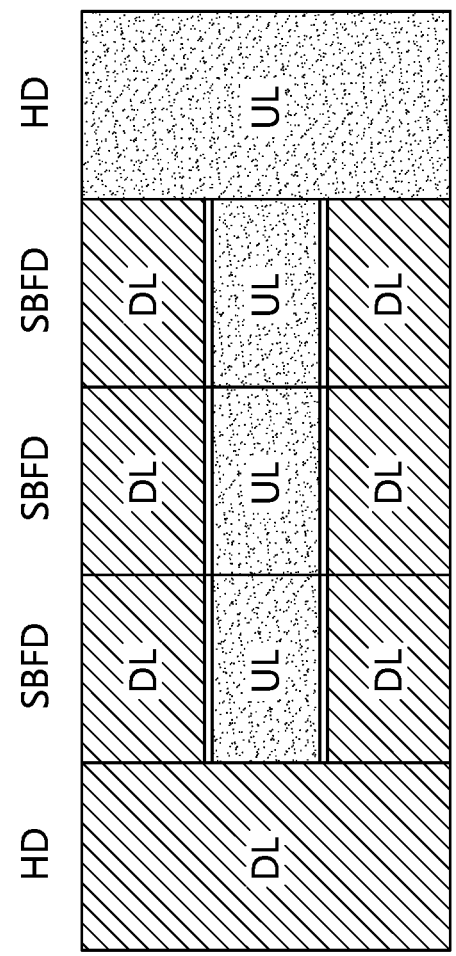
FIG. 13 illustrates a frequency-domain resource having an SBFD-based resource configuration.

FIG. 13 illustrates a frequency-domain resource having an SBFD-based resource configuration.

Referring to FIG. 13, a slot or symbol in which half-duplex-based transmission and reception can be performed is denoted by HD, and a slot or symbol in which SBFD-based transmission and reception can be performed is denoted by SBFD. In addition, a frequency resource region in which a downlink operation can be performed in each slot or symbol is denoted by DL, and a frequency resource region in which an uplink operation can be performed in each slot or symbol is denoted by UL.

Figure 14:
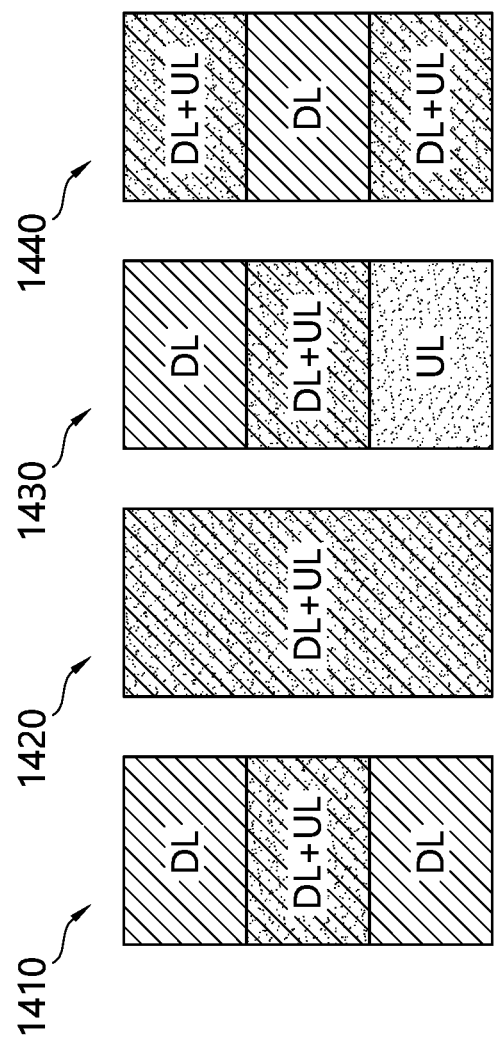
FIG. 14 illustrates a time-domain resource having an SFFD-based resource configuration.

FIG. 14 illustrates a time-domain resource having an SFFD-based resource configuration.

Specifically, an SFFD-based resource configuration in units of slots or symbols are illustrated in 1410, 1420, 1430, and 1440 of FIG. 14. In addition, a downlink sub-band frequency resource region is denoted by DL, and an uplink sub-band frequency resource region is denoted by UL.

Referring to FIG. 14, the downlink sub-band frequency resource region and the uplink sub-band frequency resource region may overlap with each other. Herein, a region in which the downlink sub-band frequency resource region and the uplink sub-band frequency resource region overlaps is denoted by DL+UL.

Figure 15:
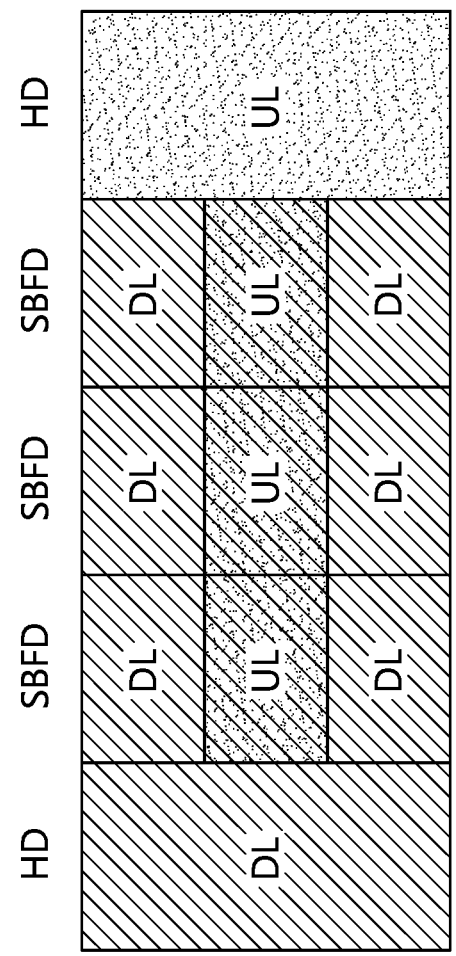
FIG. 15 illustrates a frequency-domain resource having an SFFD-based resource configuration.

FIG. 15 illustrates a frequency-domain resource having an SFFD-based resource configuration.

Referring to FIG. 15, a slot or symbol on which half-duplex-based transmission and reception can be performed is denoted by HD, and a slot or symbol on which SFFD-based transmission and reception can be performed is denoted by SFFD. In addition, a frequency resource region in which a downlink operation can be performed in each slot or symbol is denoted by DL, and a frequency resource region in which an uplink operation can be performed in each slot or symbol is denoted by UL.

Referring to FIG. 15, the slot or symbol on which half-duplex-based transmission and reception can be performed and the slot or symbol on which SFFD-based transmission and reception can be performed may be subjected to TDM.

As described above, in a network operating based on SBFD or SFFD, a method of triggering a PHR procedure of a UE applicable in a time duration in which a BS performs full-duplex-based transmission and reception operations may be different from a method of triggering a PHR procedure of a UE applicable in a time duration in which the BS performs half-duplex-based transmission and reception operations.

For example, in a time resource in which the BS performs the full-duplex-based transmission and reception operations, the BS may frequently change transmit power due to an SI cancellation performance limitation of the BS, an SI change based on a channel change, or the like. Therefore, compared to a time duration in which the BS performs the half-duplex-based transmission and reception operations, a frequent PHR report of a UE may be required in the time duration in which the BS performs the full-duplex-based transmission and reception operations. Herein, when the BS explicitly and persistently orders/instructs the PHR procedure to the UE, there may be a problem in that a resource is used inefficiently. In addition, since the BS explicitly and persistently orders/instructs the PHR procedure to the UE and the UE repeats an operation of persistently reporting the PHR information, there may be a problem of a time delay. Further, an instantaneous power control procedure may be not performed due to the aforementioned problems. Therefore, a timer for triggering the PHR procedure of the UE, used in the time duration in which the BS performs the half-duplex-based operation, and a timer for triggering the PHR procedure of the UE, used in the time duration in which the BS performs the full-duplex-based operation, may operate based on different methods. That is, different PHR timers (e.g., a periodic PHR timer and/or a PHR inhibit timer) may be used based on TDM, with respect to the time duration in which the BS performs the half-duplex-based operation and the time duration in which the BS performs the full-duplex-based operation. Alternatively, the PHR timer of the time duration in which the BS performs the full-duplex-based operation and the PHR timer of the time duration in which the BS performs the half-duplex-based operation may be used separately from each other (or independently of each other). That is, a PHR-related configuration may be changed as shown in the following table.

TABLE 6

| PHR-Config information element |
|---|
| ASN1START |
| TAG-PHR-CONFIG-START |
| PHR-Config ::=    SEQUENCE { |
| phr-PeriodicTimer              ENUMERATED {sf10, sf20, sf50, sf100, sf200, sf500, sf1000, infinity}, |
| FD-phr-PeriodicTimer ENUMERATED {sf10, sf20, sf50, sf100, sf200, sf500, sf1000, infinity}, |
| phr-ProhibitTimer              ENUMERATED {sf0, sf10, sf20, sf50, sf100, sf200, sf500, sf1000}, |
| FD-phr-ProhibitTimer ENUMERATED {sf0, sf10, sf20, sf50, sf100, sf200, sf500, sf1000}, |
| phr-Tx-PowerFactorChange                ENUMERATED {dB1, dB3, dB6, infinity}, |
| multiplePHR                    BOOLEAN, |
| dummy                          BOOLEAN, |
| phr-Type2OtherCell                BOOLEAN, |
| phr-ModeOtherCG                ENUMERATED {real, virtual}, |
| . . . |
| } |
| TAG-PHR-CONFIG-STOP |
| -- ASN1STOP |

Referring to Table 6, FD-phr-PeriodicTimer and FD-phr-ProhibitTimer may be timers used when the UE triggers the PHR procedure applied in the time duration in which the BS performs the full-duplex-based operation. In this case, regarding the time duration in which the BS performs the full-duplex-based operation, the BS may explicitly report the time duration in which the BS performs the full-duplex-based operation to the UE by using RRC, medium access control-control element (MAC-CE), DCI, or the like. Alternatively, the UE may implicitly determine the time duration in which the BS performs the full-duplex-based operation. The UE may implicitly determine the time duration in which the BS performs the full-duplex-based operation, based on a bandwidth part (BWP) configuration, a U/F/D resource configuration (i.e., a configuration indicating a link direction of a resource), or the like. For example, when a specific time resource indicated as a flexible resource through a cell-specific U/F/D configuration is indicated as an uplink resource through a UE-specific U/F/D configuration, the UE may determine the specific time resource as the time resource in which the BS performs the full-duplex-based operation. In addition, even if the BS does not report to the UE a BWP or full-duplex BWP in which the full-duplex-based operation is performed, based on a configuration or the like of a frequency resource reported by the BS to the UE through the BWP configuration, when the UE performs BWP switching to a BWP which may be determined by the UE as the BWP in which the BS performs the full-duplex operation, the UE may implicitly perform the time duration in which the BS performs the full-duplex-based operation.

Figure 16:
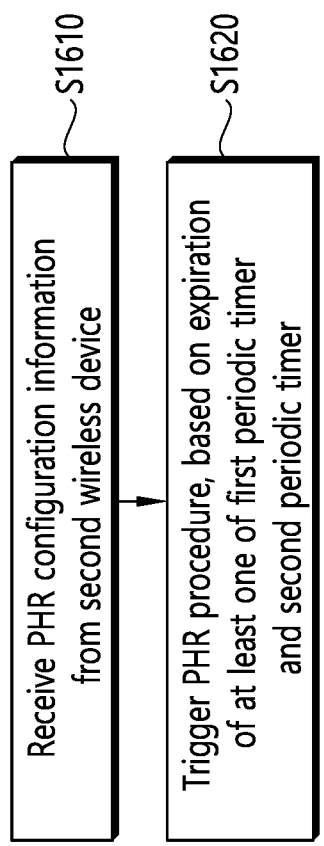
FIG. 16 is a flowchart for an example of a method of performing a PHR procedure of a first wireless device according to some implementations of the present specification.

FIG. 16 is a flowchart for an example of a method of performing a PHR procedure of a first wireless device according to some implementations of the present specification. The first wireless device may be a UE, a BS, or an IAB node.

Referring to FIG. 16, the first wireless device receives PHR configuration information from a second wireless device (S1610). Herein, the PHR configuration information may report a first timer value of a first periodic timer and a second timer value of a second periodic timer. Herein, the second wireless device may be the BS. In addition, when the first wireless device is the IAB node, the second wireless device may be a parent IAB node of the first wireless device.

The first wireless device triggers the PHR procedure, based on expiration of at least one of the first periodic timer and the second periodic timer (S1620). Herein, the first periodic trimer may be a timer for triggering the PHR procedure by a wireless device which operates the timer when the timer expires. In addition, the second periodic timer may be a timer for triggering the PHR procedure by the wireless device which operates the timer when the timer expires.

Herein, the first timer value may include a transmission period of a synchronization signal block transmitted by the second wireless device. In addition, the first timer value may be less than the second timer value.

In the example of FIG. 16, the first periodic timer may be FD-phr-PeriodicTimer proposed in the present specification. In addition, the second periodic timer may be phr-PeriodicTimer.

A method of operating the first periodic timer and the second periodic timer may conform to various methods/proposals proposed in the present specification. For example, the first periodic timer may operate only in a resource region in which full-duplex-based transmission and reception are configured, and the second periodic timer may operate only in a resource region in which half-duplex-based transmission and reception are configured. Alternatively, the first periodic timer and the second periodic timer may operate independently in the same resource region.

Figure 17:
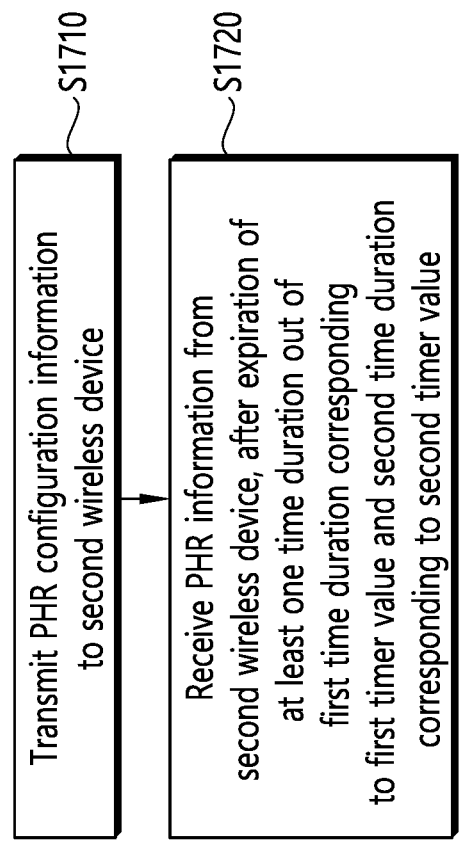
FIG. 17 is a flowchart for an example of a method of receiving PHR information of a first wireless device according to some implementations of the present specification.

FIG. 17 is a flowchart for an example of a method of receiving PHR information of a first wireless device according to some implementations of the present specification. The first wireless device may be a BS or an IAB node.

Referring to FIG. 17, the first wireless device transmits PHR configuration information to a second wireless device (S1710). Herein, the PHR configuration information may report a first timer value of a first periodic timer and a second timer value of a second periodic timer. Herein, the second wireless device may be a UE. In addition, when the first wireless device is the IAB node, the second wireless device may be a child IAB node of the first wireless device.

After expiration of at least one time duration out of a first time duration corresponding to the first timer value and a second time duration corresponding to the second timer value, the first wireless deceive receives the PHR information from the second wireless device (S1720). Herein, the PHR information may report a power headroom of the second wireless device. In addition, the first timer value may include a transmission period of a synchronization signal block transmitted by the first wireless device.

Each of FIG. 16 and FIG. 17 illustrates a flowchart for an embodiment to which only some of various methods/proposals disclosed in the present specification are applied. It is apparent that the various methods/proposals disclosed in the present specification are applicable to the embodiment.

Methods proposed in the present specification may include at least one computer readable medium, which is executed by at least one processor, one or more processors, and one or more memoires operatively coupled by means of the one or more processors and storing instructions, in addition to a UE, a BS, and an IAB node. The one or more processors may also be performed by an apparatus configured to control the UE, the BS, and the IAB node and performing methods proposed in the present specification by executing the instructions. In addition, according to the methods proposed in the present specification, it is apparent that an operation to be performed by another UE, another BS, and another IAB node, corresponding to an operation performed by the UE, the BS, and the IAB node, may be considered.

Hereinafter, an example of a communication system to which the present disclosure is applied will be described.

Although not limited to this, various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
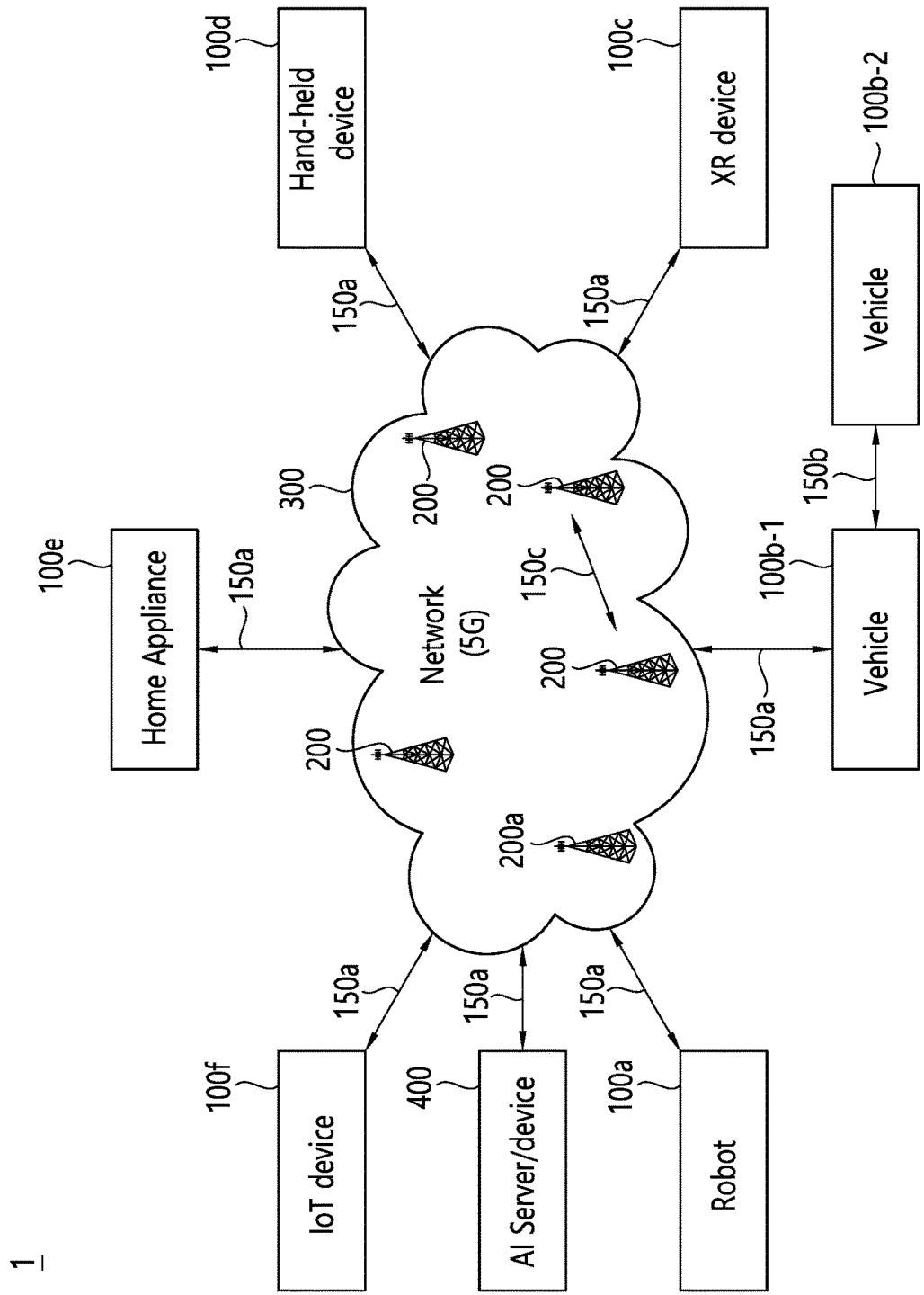
FIG. 18 shows a communication system (1), in accordance with an embodiment of the present disclosure.

FIG. 18 shows a communication system (1), in accordance with an embodiment of the present disclosure.

Referring to FIG. 18, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

Here, the wireless communication technology implemented in the wireless device of the present specification may include a narrowband Internet of Things for low-power communication as well as LTE, NR, and 6G. In this case, for example, the NB-IoT technology may be an example of a Low Power Wide Area Network (LPWAN) technology. In addition, it may be implemented in standards such as LTE Cat NB1 and/or LTE Cat NB2, and is not limited to the above-described name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless device of the present specification may include at least one of ZigBee, Bluetooth, and Low Power Wide Area Network (LPWAN) in consideration of low-power communication, and is not limited to the above-described name. For example, the ZigBee technology can create PAN (personal area networks) related to small/low-power digital communication based on various standards such as IEEE 802.15.4, and can be called by various names.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
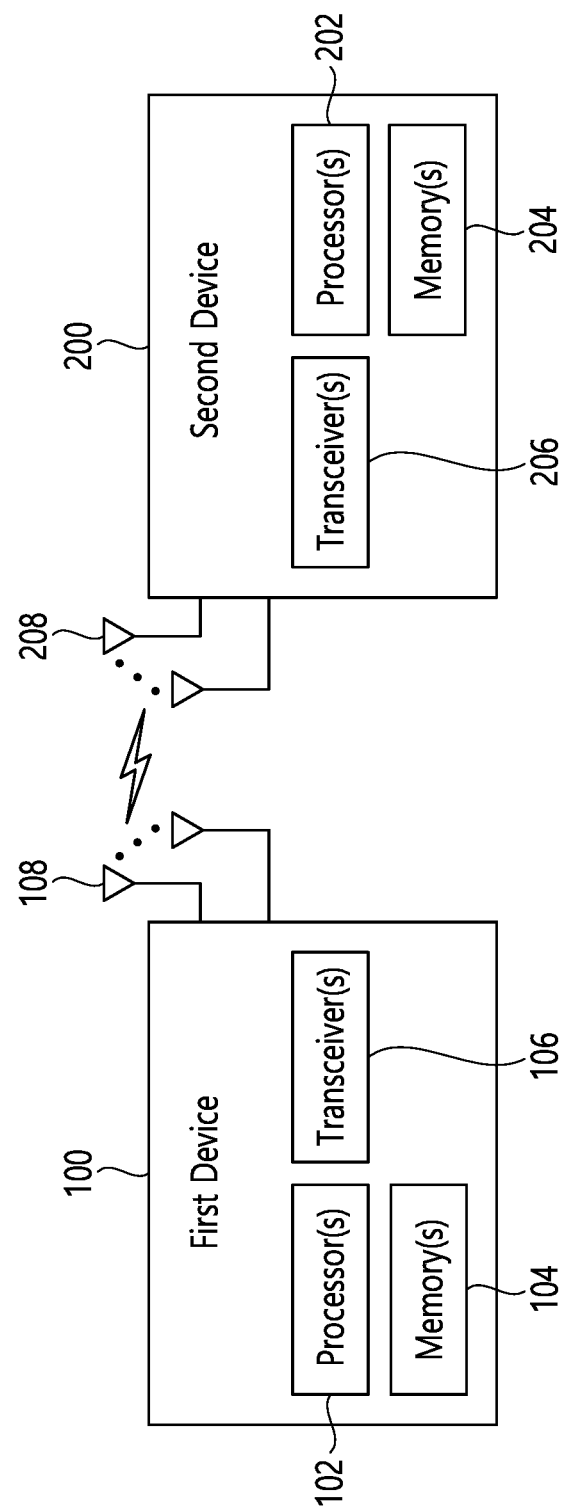
FIG. 19 shows wireless devices, in accordance with an embodiment of the present disclosure.

FIG. 19 shows wireless devices, in accordance with an embodiment of the present disclosure.

Referring to FIG. 19, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 18.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 20:
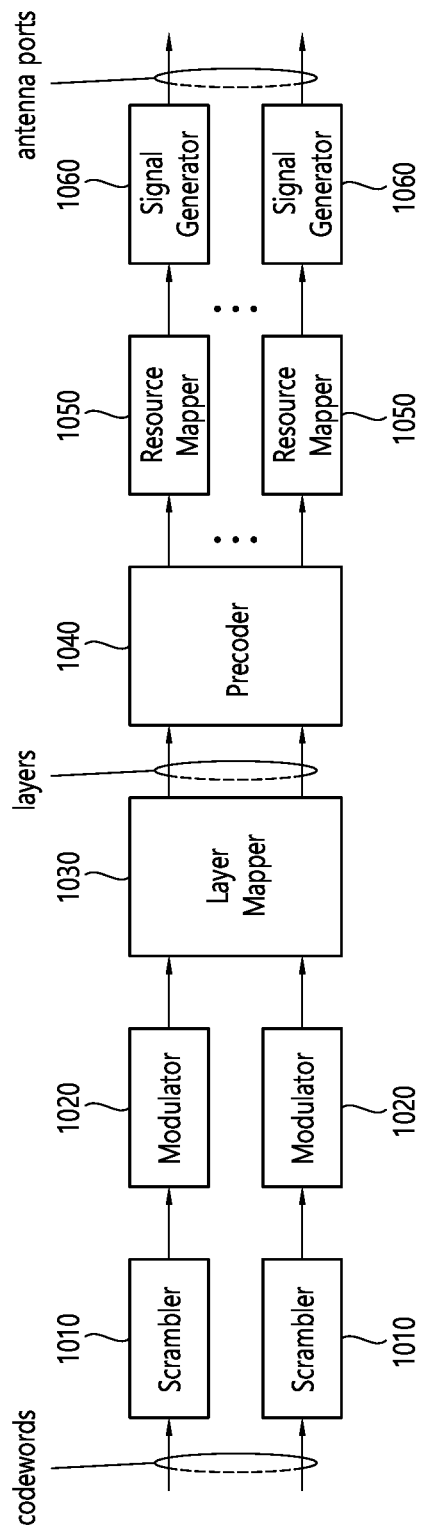
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit (1000) may include scramblers (1010), modulators (1020), a layer mapper (1030), a precoder (1040), resource mappers (1050), and signal generators (1060). An operation/function of FIG. 20 may be performed, without being limited to, the processors (102, 202) and/or the transceivers (106, 206) of FIG. 19. Hardware elements of FIG. 20 may be implemented by the processors (102, 202) and/or the transceivers (106, 206) of FIG. 19. For example, blocks 1010-1060 may be implemented by the processors (102, 202) of FIG. 19. Alternatively, the blocks 1010-1050 may be implemented by the processors (102, 202) of FIG. 19 and the block 1060 may be implemented by the transceivers (106, 206) of FIG. 19.

Codewords may be converted into radio signals via the signal processing circuit (1000) of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010-1060) of FIG. 20. For example, the wireless devices (e.g., 100, 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
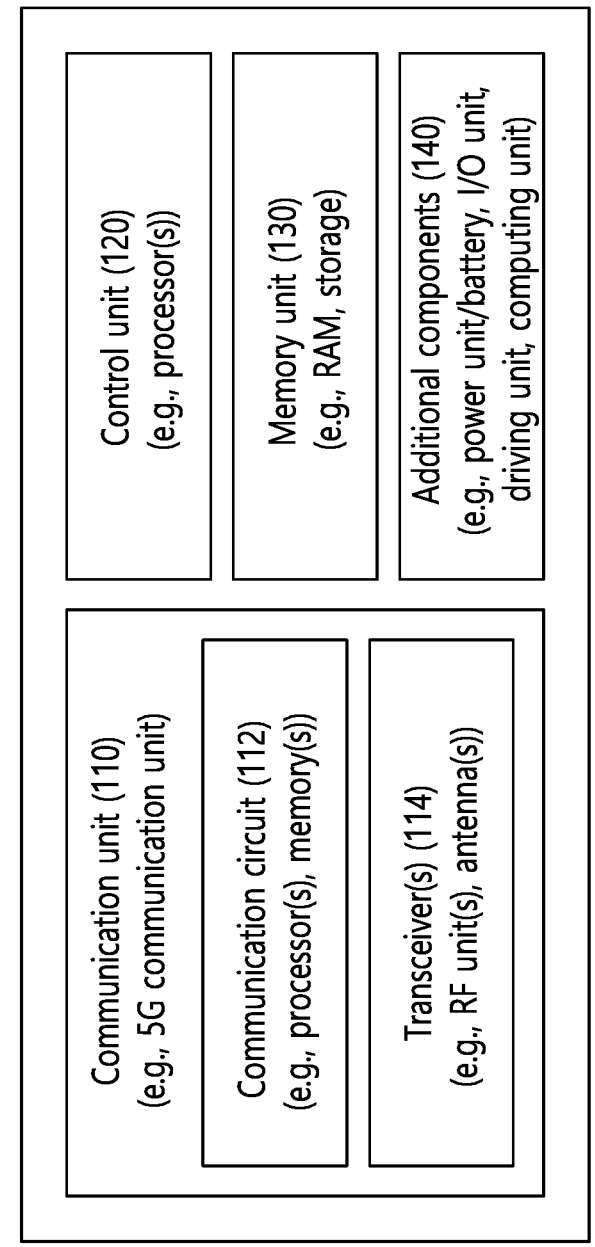
FIG. 21 shows another example of a wireless device, in accordance with an embodiment of the present disclosure.

FIG. 21 shows another example of a wireless device, in accordance with an embodiment of the present disclosure. The wireless device may be implemented in various forms according to a use-case/service (refer to FIG. 18).

Referring to FIG. 21, wireless devices (100, 200) may correspond to the wireless devices (100, 200) of FIG. 19 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 19. For example, the transceiver(s) (114) may include the one or more transceivers (106, 206) and/or the one or more antennas (108, 208) of FIG. 19. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 18), the vehicles (100*b*-1, 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, and so on. The wireless device may be used in a mobile or fixed place according to a use-example/service.

In FIG. 21, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
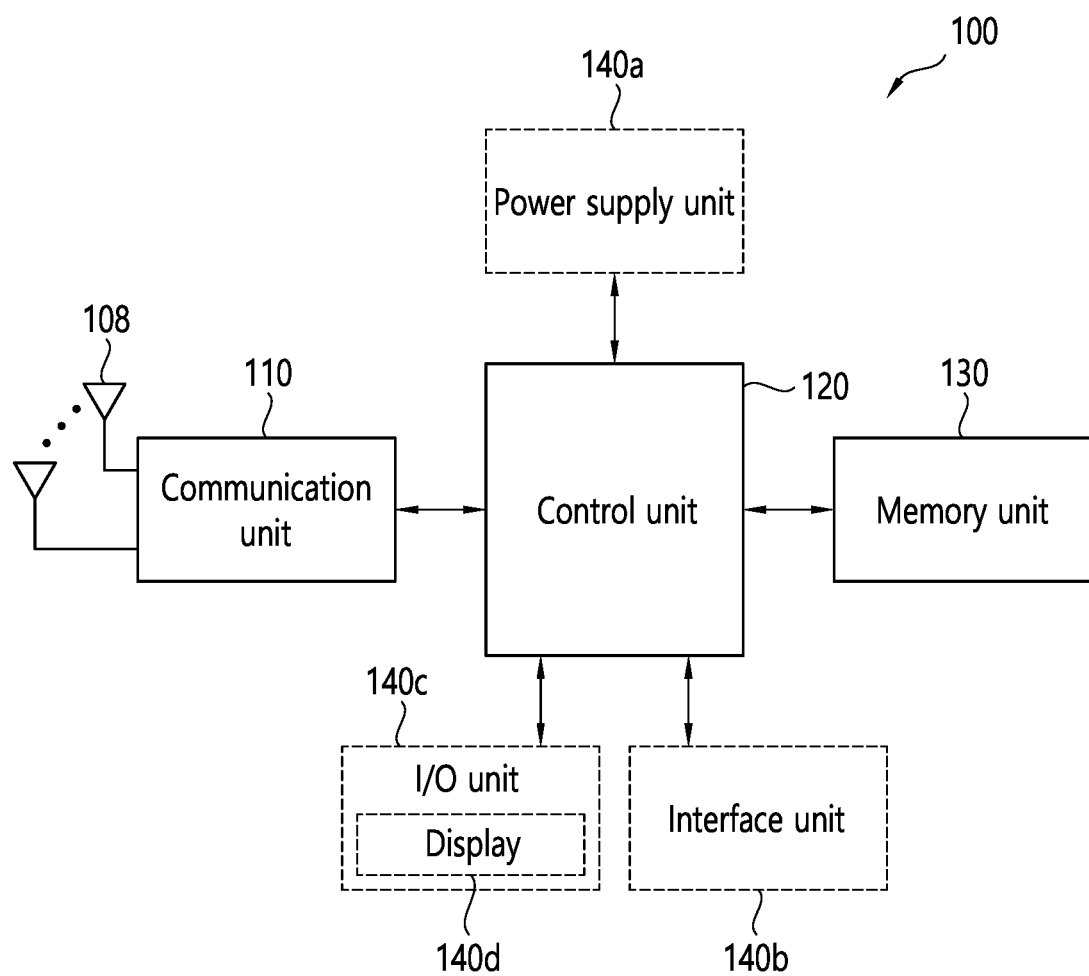
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110~130/140*a*~140*c* correspond to the blocks 110~130/140 of FIG. 21, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 23:
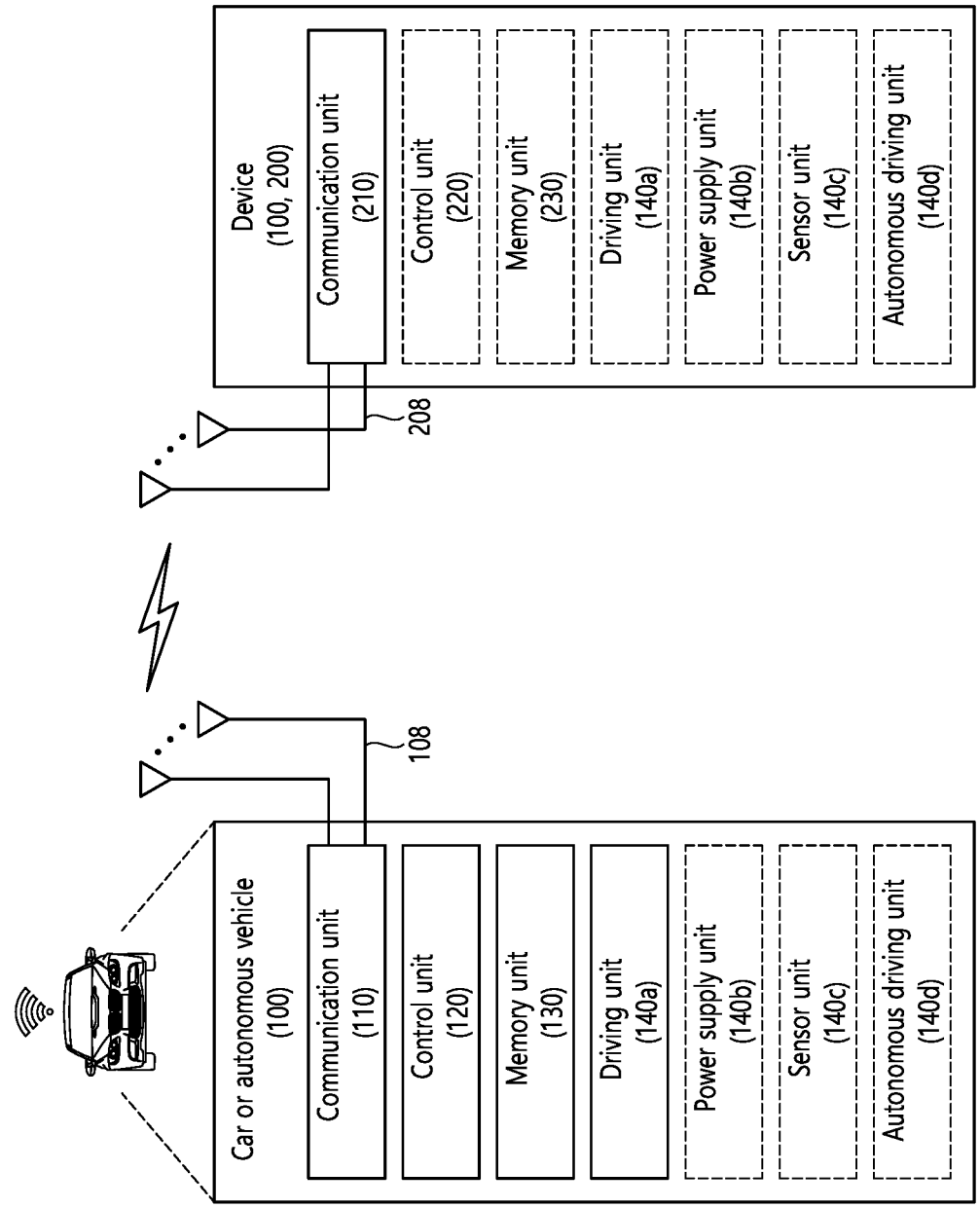
FIG. 23 shows a vehicle or an autonomous vehicle, in accordance with an embodiment of the present disclosure.

FIG. 23 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 23, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 21, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 24:
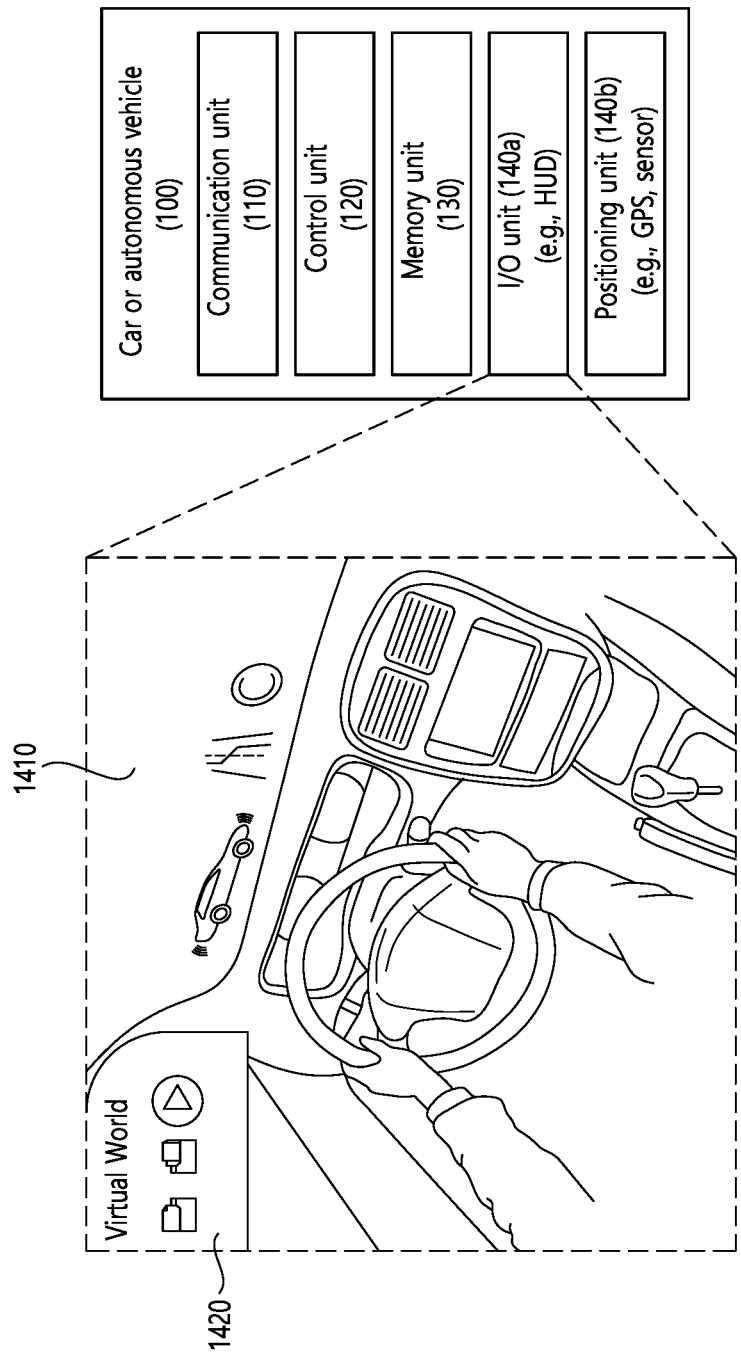
FIG. 24 shows a vehicle, in accordance with an embodiment of the present disclosure.

FIG. 24 shows a vehicle, in accordance with an embodiment of the present disclosure. The vehicle may be implemented as a transport means, an aerial vehicle, a ship, and so on.

Referring to FIG. 24, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 21.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 25:
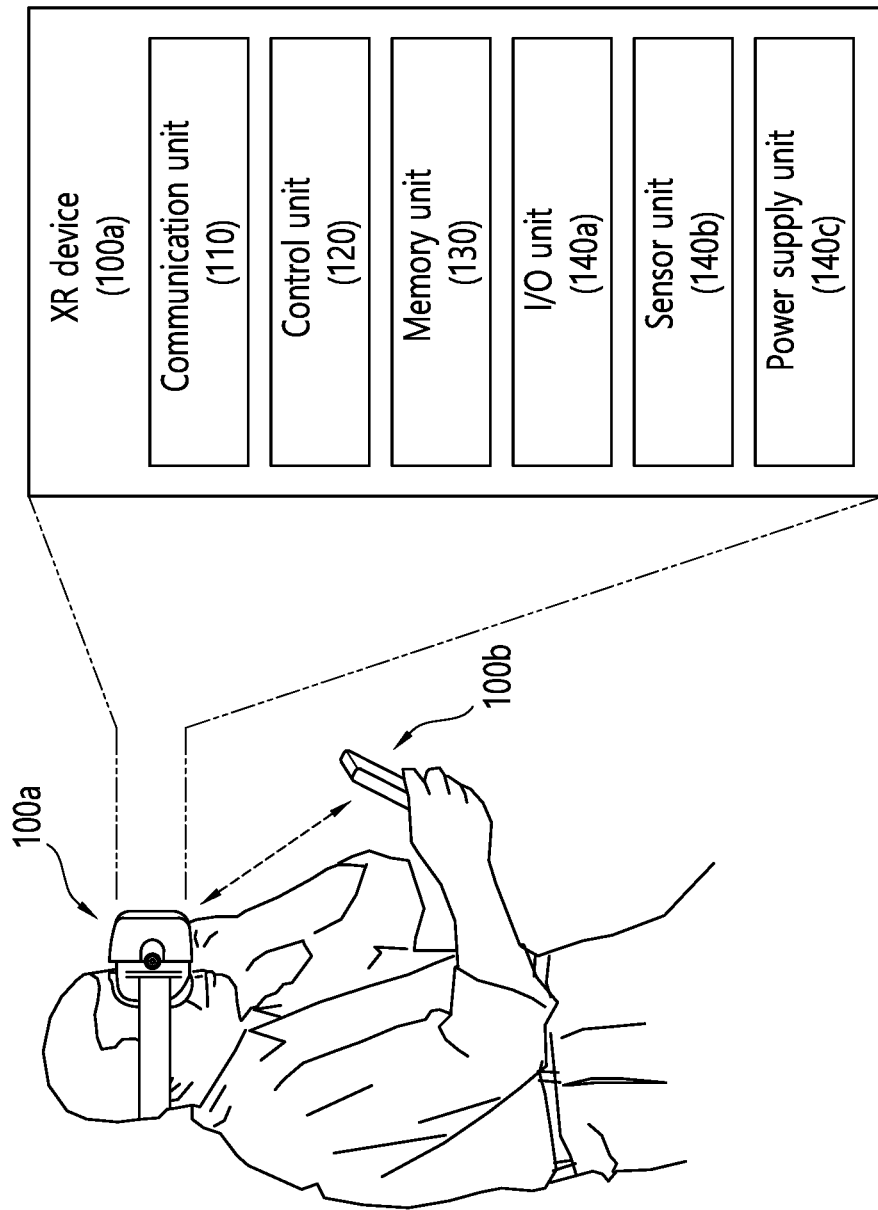
FIG. 25 shows an XR device, in accordance with an embodiment of the present disclosure.

FIG. 25 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 25, an XR device (100*a*) may include a communication unit (110), a control unit (120), a memory unit (130), an I/O unit (140*a*), a sensor unit (140*b*), and a power supply unit (140*c*). Herein, the blocks 110~130/140*a*~140*c* correspond to the blocks 110~130/140 of FIG. 31, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device 100*b*) or a media server through the communication unit (130). The communication unit (130) may download/stream content such as films or news from another device (e.g., the hand-held device 100*b*) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100*b*). For example, the hand-held device (100*b*) may operate as a controller of the XR device (100*a*). To this end, the XR device (100*a*) may obtain information on a 3D position of the hand-held device (100*b*) and generate and output an XR object corresponding to the hand-held device (100*b*).

Figure 26:
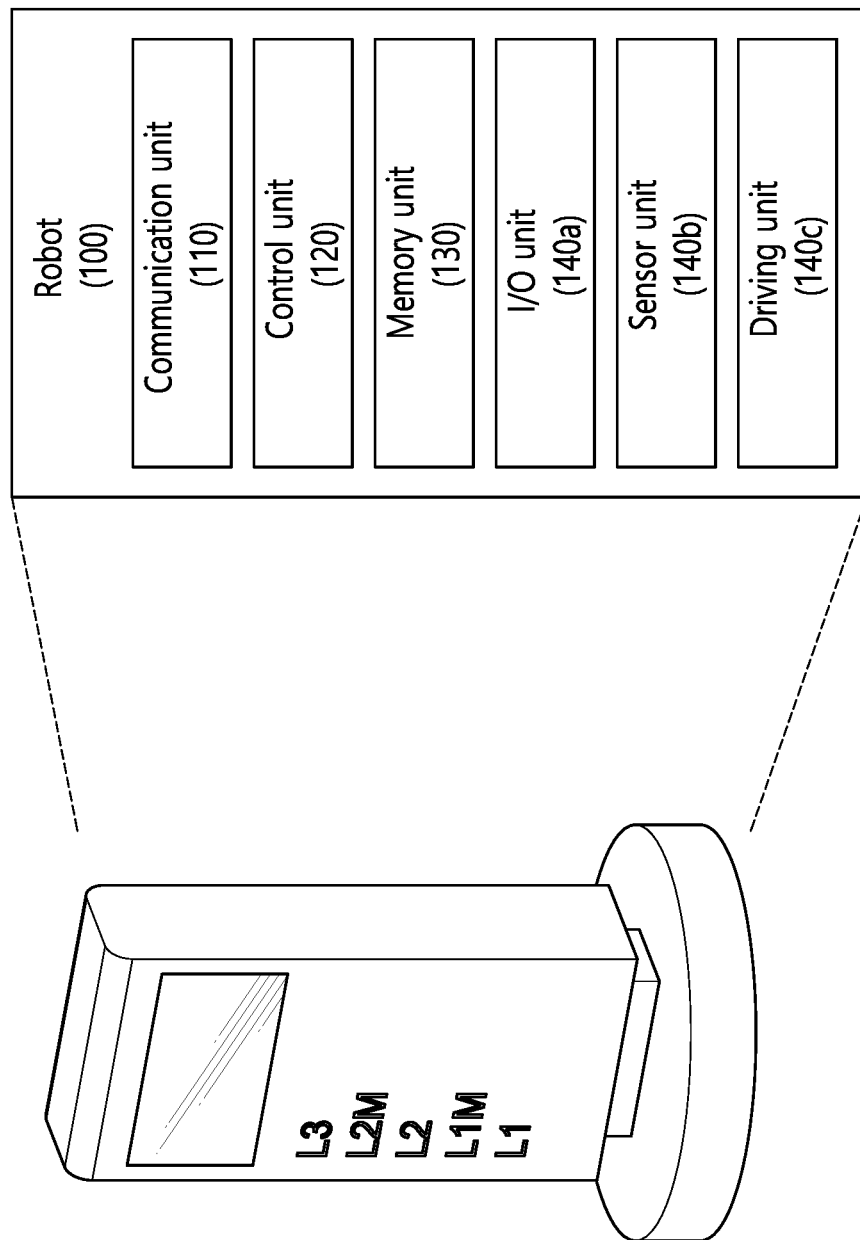
FIG. 26 shows a robot, in accordance with an embodiment of the present disclosure.

FIG. 26 shows a robot, in accordance with an embodiment of the present disclosure. The robot may be categorized into an industrial robot, a medical robot, a household robot, a military robot, and so on, according to a used purpose or field.

Referring to FIG. 26, a robot (100) may include a communication unit (110), a control unit (120), a memory unit (130), an I/O unit (140*a*), a sensor unit (140*b*), and a driving unit (140*c*). Herein, the blocks 110~130/140*a*~140*c* correspond to the blocks 110~130/140 of FIG. 21, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, and so on. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140*c*) may perform various physical operations such as movement of robot joints. In addition, the driving unit (140*c*) may cause the robot (100) to travel on the road or to fly. The driving unit (140*c*) may include an actuator, a motor, a wheel, a brake, a propeller, and so on.

Figure 27:
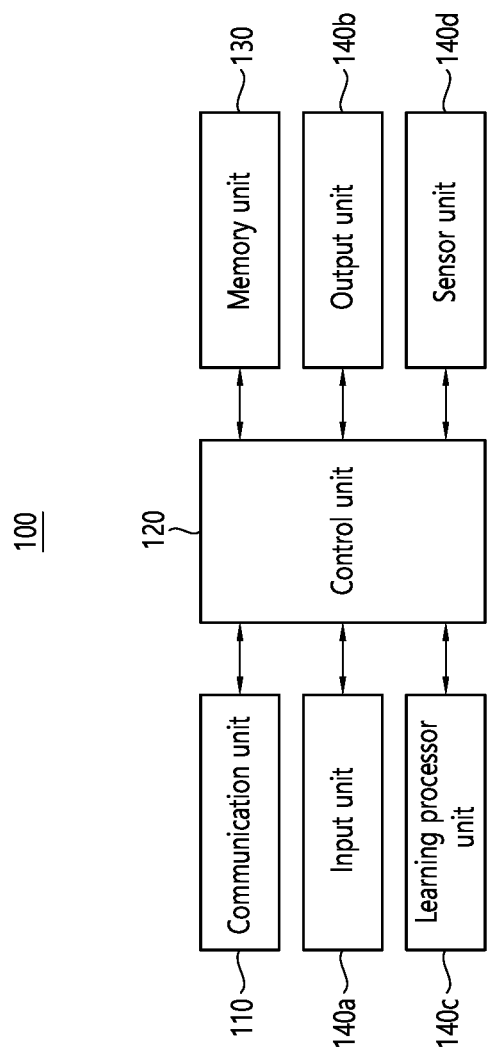
FIG. 27 shows an AI device, in accordance with an embodiment of the present disclosure.

FIG. 27 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 27, an AI device (100) may include a communication unit (110), a control unit (120), a memory unit (130), an I/O unit (140*a*/140*b*), a learning processor unit (140*c*), and a sensor unit (140*d*). The blocks 110-130/140*a*~140*d* correspond to blocks 110~130/140 of FIG. 21, respectively.

The communication unit (110) may transmit and receive wired/radio signals (e.g., sensor information, user input, learning models, or control signals) to and from external devices such as other AI devices (e.g., 100*x*, 200,400 of FIG. 18) or an AI server (e.g., 400 of FIG. 18) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 19). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 18). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

The claims set forth herein can be combined in a variety of ways. For example, the technical features of the method claims of the present specification may be combined to be implemented as a device, and the technical features of the device claims of the present specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method, comprising:
   receiving, by a user equipment (UE), power headroom report (PHR) configuration information from a base station, wherein the PHR configuration information includes information related to a timer for PHR reporting; and
   transmitting, by the UE, a PHR to the base station based on the PHR configuration information,
   wherein the PHR configuration information includes a first value for a first periodic timer related to a full duplex (FD) PHR and a second value for a second periodic timer related to a half duplex (HD) PHR,
   wherein, in a full duplex time duration, the FD PHR is triggered based on expiration of the first periodic timer,
   wherein, in a half duplex time duration, the HD PHR is triggered based on expiration of the second periodic timer, and
   wherein the first value, which is smaller than the second value, is equal to a transmission period of a synchronization signal block of the base station.

2. The method of claim 1, wherein a first resource region in which the first periodic timer operates is the same as a second resource region in which the second periodic timer operates.

3. The method of claim 1, wherein a first resource region in which the first periodic timer operates is different from a second resource region in which the second periodic timer operates.

4. The method of claim 3,
   wherein the first resource region is a resource region where transmission and reception are set to overlap in a time domain for a specific time duration, and
   wherein the second resource region is a resource region where transmission and reception are set to not overlap in the time domain for the specific time duration.

5. The method of claim 3, wherein the first resource region includes a resource region in which a full-duplex based operation is configured, a resource region in which a sub-band full-duplex (SBFD)-based operation is configured, and a resource region in which a single frequency full-duplex (SFFD)-based operation is configured.

6. The method of claim 3,
   wherein the UE receives resource configuration information from the base station, and
   wherein the resource configuration information reports the first resource region and the second resource region.

7. The method of claim 6,
   wherein the UE receives downlink control information (DCI) from the base station, and
   wherein the DCI includes the resource configuration information.

8. The method of claim 6, wherein the resource configuration information is included in the PHR configuration information.

9. The method of claim 3,
   wherein the UE receives bandwidth part (BWP) configuration information from the second wireless device base station, and
   wherein the UE determines the first resource region and the second resource region, based on the BWP configuration information.

10. The method of claim 9,
    wherein the UE receives link configuration information from the base station, wherein the link configuration information reports a configuration of an uplink resource, downlink resource, and flexible resource, and wherein the UE determines the first resource region and the second resource region, based on the BWP configuration information.

11. The method of claim 1, wherein the first timer value is one of a plurality of predetermined values, and the second time value is one of a plurality of predetermined values.

12. The method of claim 1, wherein the PHR configuration information is transmitted through a radio resource control (RRC) signal.

13. A user equipment (UE), comprising:
    at least one transceiver;
    at least one memory; and
    at least one processor operably connectable to the at least one transceiver and the at least one memory,
    wherein the at least one memory stores instructions that, based on being executed by the at least one processor, cause the at least one processor to perform operations comprising:
    receiving, by the UE, power headroom report (PHR) configuration information from a base station, wherein the PHR configuration information includes information related to a timer for PHR reporting; and
    transmitting, by the UE, a PHR to the base station based on the PHR configuration information,
    wherein the PHR configuration information includes a first value for a first periodic timer related to a full duplex (FD) PHR and a second value for a second periodic timer related to a half duplex (HD) PHR,
    wherein, in a full duplex time duration, the FD PHR is triggered based on expiration of the first periodic timer,
    wherein, in a half duplex time duration, the HD PHR is triggered based on expiration of the second periodic timer, and
    wherein the first value, which is smaller than the second value, is equal to a transmission period of a synchronization signal block of the base station.

14. An apparatus configured to control a user equipment (UE), the apparatus comprising:
    at least one memory; and
    at least one processor operably connectable to the at least one memory,
    wherein the at least one memory stores instructions that, based on being executed by the at least one processor, cause the at least one processor to perform operations comprising:
    receiving, by the UE, power headroom report (PHR) configuration information from a base station, wherein the PHR configuration information includes information related to a timer for PHR reporting; and
    transmitting, by the UE, a PHR to the base station based on the PHR configuration information,
    wherein the PHR configuration information includes a first value for a first periodic timer related to a full duplex (FD) PHR and a second value for a second periodic timer related to a half duplex (HD) PHR,
    wherein, in a full duplex time duration, the FD PHR is triggered based on expiration of the first periodic timer,
    wherein, in a half duplex time duration, the HD PHR is triggered based on expiration of the second periodic timer, and
    wherein the first value, which is smaller than the second value, is equal to a transmission period of a synchronization signal block of the base station.

* * * * *